United States Patent
Yang et al.

(10) Patent No.: US 10,873,482 B2
(45) Date of Patent: Dec. 22, 2020

(54) TRANSMITTER SCHEMES TO FACILITATE SIDE CHANNEL INFORMATION ESTIMATION

(71) Applicant: QUALCOMM Incorporated, San Diego, CA (US)

(72) Inventors: Lin Yang, San Diego, CA (US); Bin Tian, San Diego, CA (US); Jialing Li Chen, San Diego, CA (US); Louay Jalloul, San Jose, CA (US); Vincent Knowles Jones, IV, Redwood, CA (US); Ning Zhang, Saratoga, CA (US); Chi-Lin Su, Zhubei (TW); Ahmad Abdulrahman Mohammed, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/136,572

(22) Filed: Sep. 20, 2018

(65) Prior Publication Data

US 2019/0116068 A1 Apr. 18, 2019

Related U.S. Application Data

(60) Provisional application No. 62/574,049, filed on Oct. 18, 2017.

(51) Int. Cl.
*H04L 25/02* (2006.01)
*H04L 27/26* (2006.01)
(Continued)

(52) U.S. Cl.
CPC ........ *H04L 25/0242* (2013.01); *H04L 5/0023* (2013.01); *H04L 5/0051* (2013.01);
(Continued)

(58) Field of Classification Search
CPC ... H04L 69/324; H04W 72/046; H04B 7/0671
See application file for complete search history.

(56) References Cited

U.S. PATENT DOCUMENTS

| 9,088,504 | B2 * | 7/2015 | Yang | H04L 41/16 |
| 2007/0104283 | A1 * | 5/2007 | Han | H04L 1/0606 |
| | | | | 375/260 |

(Continued)

*Primary Examiner* — Melanie Jagannathan
(74) *Attorney, Agent, or Firm* — Kevin M. Donnelly; Holland & Hart LLP

(57) ABSTRACT

Methods, systems, and devices for wireless communication are described. In some systems (e.g., Wi-Fi systems), a transmitting device such as an access point (AP) or mobile station (STA), may identify a number of spatial streams for a data transmission that is less than a number of transmit antennas, and may transmit a packet over a channel. In a first implementation, the packet may be formatted in a multi-user frame format, with a number of long training field (LTF) symbols equal to the number of transmit antennas. In a second implementation, the packet may be a null data packet (NDP), and the device may transmit a separate data packet. In a third implementation, the packet may be formatted in single-user frame format with a modified LTF. A receiving device may receive the packet, and may perform channel estimation and power amplifier (PA) distortion cancellation based on the received packet.

28 Claims, 17 Drawing Sheets

(51) Int. Cl.
*H04W 72/04* (2009.01)
*H04L 5/00* (2006.01)

(52) U.S. Cl.
CPC ........ *H04L 27/261* (2013.01); *H04L 27/2605* (2013.01); *H04W 72/0473* (2013.01); *H04L 5/001* (2013.01)

(56) References Cited

U.S. PATENT DOCUMENTS

| | | | | |
|---|---|---|---|---|
| 2009/0122882 | A1* | 5/2009 | Mujtaba | H04L 27/261 375/260 |
| 2011/0273977 | A1* | 11/2011 | Shapira | H04B 7/0617 370/208 |
| 2011/0274003 | A1* | 11/2011 | Pare, Jr. | H04W 4/08 370/252 |
| 2012/0127940 | A1* | 5/2012 | Lee | H04L 5/001 370/329 |
| 2013/0315219 | A1* | 11/2013 | Cheong | H04L 5/0044 370/338 |
| 2016/0119047 | A1* | 4/2016 | Lee | H04W 48/16 370/329 |
| 2017/0019306 | A1* | 1/2017 | Van Zelst | H04L 1/0079 |
| 2017/0201975 | A1* | 7/2017 | Yang | H04L 69/324 |

* cited by examiner

TRANSMITTER SCHEMES TO FACILITATE SIDE CHANNEL INFORMATION ESTIMATION

CROSS REFERENCES

The present Application for Patent claims the benefit of U.S. Provisional Patent Application No. 62/574,049 by YANG, et al., entitled "TRANSMITTER SCHEMES TO FACILITATE SIDE CHANNEL INFORMATION ESTIMATION," filed Oct. 18, 2017, assigned to the assignee hereof, and expressly incorporated herein.

BACKGROUND

The following relates generally to wireless communication, and more specifically to transmitter schemes to facilitate side channel information estimation.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink and uplink. The downlink (or forward link) may refer to the communication link from the AP to the STA, and the uplink (or reverse link) may refer to the communication link from the STA to the AP.

In some wireless communications systems, the use of a power amplifier (PA) in the transmission of a signal may result in PA non-linearity distortion of the signal at a receiving device. The receiving device may utilize an inverse matrix function to compensate for the PA distortion and to recover the transmitted signal. However, if the transmitting device transmits the signal using a greater number of transmit antennas than spatial streams, the receiving device may not be able to perform an inverse matrix function. Accordingly, the receiving device may not be able to accurately mitigate the PA distortion in received signals.

SUMMARY

The described techniques relate to improved methods, systems, devices, or apparatuses that support transmitter schemes to facilitate side channel information estimation. Generally, the described techniques provide for a receiving device, such as an access point (AP) or mobile station (STA) in a wireless system (e.g., a Wi-Fi network), to estimate a side channel. A first wireless device (i.e., the transmitting device) may identify a number of spatial streams (e.g., space-time streams) for a data transmission, and may transmit a packet over a wireless channel. The packet may be an example of a data packet or a null data packet (NDP) and may include a long training field (LTF). The LTF may contain a number of symbols—for example, orthogonal frequency division multiplexing (OFDM) symbols—that is equal to a number of transmit antennas for the data transmission, where the number of transmit antennas is greater than the number of spatial streams for the data transmission. In a first implementation, the packet may be formatted in a multi-user (MU) frame format, with as many LTF symbols as transmit antennas. In a second implementation, the packet may be an NDP with as many LTF symbols as transmit antennas, and the transmitting device may transmit a data packet in addition to the NDP. In a third implementation, the packet may be formatted in a single-user (SU) frame format with a modified LTF. The transmitting device may transmit the LTF using a same number of spatial streams as transmit antennas. A second wireless device (e.g., the receiving device) may receive the packet, and may determine a channel estimation per transmit chain based on the received packet. The receiving device may utilize this channel estimation to cancel or compensate for power amplifier (PA) distortion in received signals. The receiving device may further receive data transmissions—which may include the packet or be separate from the packet—from the transmitting device based on the determined channel estimation.

A method for wireless communication is described. The method may include identifying a first number of spatial streams for a data transmission and generating a packet containing an LTF, the LTF containing a number of OFDM symbols that is equal to a number of transmit antennas for the data transmission, where the number of transmit antennas for the data transmission is greater than the first number of spatial streams for the data transmission. The method may further include transmitting the packet over a wireless channel with the LTF transmitted using a second number of spatial streams equal to the number of transmit antennas.

An apparatus for wireless communication is described. The apparatus may include means for identifying a first number of spatial streams for a data transmission and means for generating a packet containing an LTF, the LTF containing a number of OFDM symbols that is equal to a number of transmit antennas for the data transmission, where the number of transmit antennas for the data transmission is greater than the first number of spatial streams for the data transmission. The apparatus may further include means for transmitting the packet over a wireless channel with the LTF transmitted using a second number of spatial streams equal to the number of transmit antennas.

Another apparatus for wireless communication is described. The apparatus may include a processor, memory in electronic communication with the processor, and instructions stored in the memory. The instructions may be operable to cause the processor to identify a first number of spatial streams for a data transmission and generate a packet containing an LTF, the LTF containing a number of OFDM symbols equal to a number of transmit antennas for the data transmission, where the number of transmit antennas for the data transmission is greater than the first number of spatial streams for the data transmission. The instructions may be further operable to cause the processor to transmit the packet over a wireless channel, with the LTF transmitted using a second number of spatial streams equal to the number of transmit antennas.

A non-transitory computer-readable medium for wireless communication is described. The non-transitory computer-readable medium may include instructions operable to cause a processor to identify a first number of spatial streams for a data transmission and generate a packet containing an LTF, the LTF containing a number of OFDM symbols that is equal to a number of transmit antennas for the data transmission, where the number of transmit antennas for the data transmission is greater than the first number of spatial streams for the data transmission. The instructions may be further operable to cause the processor to transmit the packet over a wireless channel with the LTF transmitted using a second number of spatial streams equal to the number of transmit antennas.

In some examples of the method, apparatus, and non-transitory computer-readable medium described above, transmitting the packet includes formatting the packet in a multi-user frame format.

In some examples of the method, apparatus, and non-transitory computer-readable medium described above, transmitting the packet further includes spreading a transmit power for the data transmission over a number of the transmit antennas using a pre-coding matrix. In some examples of the method, apparatus, and non-transitory computer-readable medium described above, the transmit power may be spread evenly across a number of the transmit antennas. In some examples of the method, apparatus, and non-transitory computer-readable medium described above, the pre-coding matrix may be an orthogonal matrix.

In some examples of the method, apparatus, and non-transitory computer-readable medium described above, the spatial streams for the data transmission may be a first set of spatial streams. Some examples of the method, apparatus, and non-transitory computer-readable medium described above may further include processes, features, means, or instructions for assigning a non-zero transmit power to the first set of spatial streams for the data transmission. Some examples of the method, apparatus, and non-transitory computer-readable medium described above may further include processes, features, means, or instructions for assigning zero transmit power to a second set of spatial streams for the data transmission, where a total number of spatial streams contains the first set of spatial streams and the second set of spatial streams may be equal to the second number of spatial streams.

In some examples of the method, apparatus, and non-transitory computer-readable medium described above, the packet may be an NDP, and transmitting the packet includes transmitting the packet using the second number of spatial streams. Some examples of the method, apparatus, and non-transitory computer-readable medium described above may further include processes, features, means, or instructions for transmitting a data packet using the first number of spatial streams and the transmit antennas.

In some examples of the method, apparatus, and non-transitory computer-readable medium described above, the packet may further include a modified signaling (SIG) field, the modified SIG field containing an indication of the number of transmit antennas, the number of OFDM symbols for the LTF, or both.

A method for wireless communication is described. The method may include receiving a packet containing an LTF, the LTF containing a number of OFDM symbols that is equal to a number of transmit antennas for a data transmission, where the number of transmit antennas for the data transmission is greater than a number of spatial streams for the data transmission. The method may further include determining a channel estimation per spatial stream of the number of spatial streams based at least in part on the received packet, and receiving the data transmission based on the determined channel estimation.

An apparatus for wireless communication is described. The apparatus may include means for receiving a packet containing an LTF, the LTF containing a number of OFDM symbols that is equal to a number of transmit antennas for a data transmission, where the number of transmit antennas for the data transmission is greater than a number of spatial streams for the data transmission. The apparatus may further include means for determining a channel estimation per spatial stream of the number of spatial streams based at least in part on the received packet, and means for receiving the data transmission based on the determined channel estimation.

Another apparatus for wireless communication is described. The apparatus may include a processor, memory in electronic communication with the processor, and instructions stored in the memory. The instructions may be operable to cause the processor to receive a packet containing an LTF, the LTF containing a number of OFDM symbols that is equal to a number of transmit antennas for a data transmission, where the number of transmit antennas for the data transmission is greater than a number of spatial streams for the data transmission. The instructions may be further operable to cause the processor to determine a channel estimation per spatial stream of the number of spatial streams based at least in part on the received packet, and receive the data transmission based on the determined channel estimation.

A non-transitory computer-readable medium for wireless communication is described. The non-transitory computer-readable medium may include instructions operable to cause a processor to receive a packet containing an LTF, the LTF containing a number of OFDM symbols that is equal to a number of transmit antennas for a data transmission, where the number of transmit antennas for the data transmission is greater than a number of spatial streams for the data transmission. The instructions may be further operable to cause the processor to determine a channel estimation per spatial stream of the number of spatial streams based at least in part on the received packet, and receive the data transmission based on the determined channel estimation.

In some examples of the method, apparatus, and non-transitory computer-readable medium described above, the LTF is received in a different number of spatial streams equal to the number of transmit antennas.

In some examples of the method, apparatus, and non-transitory computer-readable medium described above, the received packet may be formatted in a multi-user frame format.

Some examples of the method, apparatus, and non-transitory computer-readable medium described above may further include processes, features, means, or instructions for demodulating the received packet using a pre-coding matrix. In some examples of the method, apparatus, and non-transitory computer-readable medium described above, the pre-coding matrix may be an orthogonal matrix.

In some examples of the method, apparatus, and non-transitory computer-readable medium described above, the spatial streams for the data transmission include a subset of spatial streams of a total set of spatial streams, a size of the total set of spatial streams equal to the number of transmit antennas, and receiving the packet in the subset of spatial streams.

In some examples of the method, apparatus, and non-transitory computer-readable medium described above, the received packet may be an NDP, and receiving the packet includes receiving the packet in a packet transmission using a same number of spatial streams as transmit antennas for the packet transmission.

Some examples of the method, apparatus, and non-transitory computer-readable medium described above may further include processes, features, means, or instructions for determining a second channel estimation based at least in part on the received data transmission. Some examples of the method, apparatus, and non-transitory computer-readable medium described above may further include processes, features, means, or instructions for performing a calibration process on the channel estimation and the second channel estimation. In some examples of the method, apparatus, and non-transitory computer-readable medium described above, performing the calibration process includes performing the calibration process based on a difference between the received packet and the received data transmission in automatic gain control (AGC), timing, frequency, phase, or a combination thereof.

In some examples of the method, apparatus, and non-transitory computer-readable medium described above, the packet further contains a modified SIG field. Some examples of the method, apparatus, and non-transitory computer-readable medium described above may further include processes, features, means, or instructions for determining the number of transmit antennas for the data transmission, the number of OFDM symbols for the LTF, or both based on an indication in the modified SIG field.

DETAILED DESCRIPTION

Figure 1:
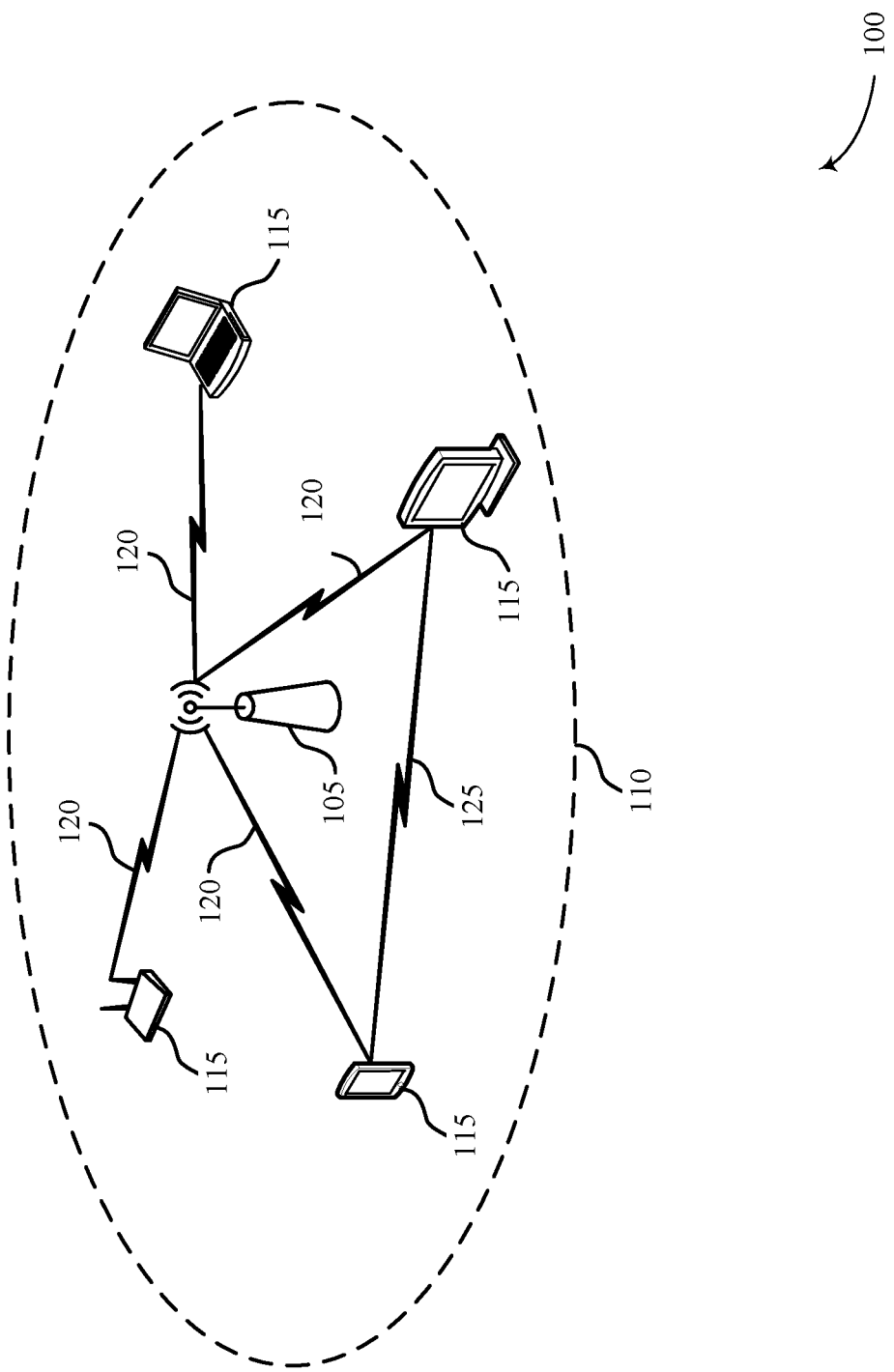
FIG. 1 illustrates a wireless local area network (WLAN) configured in accordance with various aspects of the present disclosure.

In some wireless systems (e.g., wireless local area networks (WLANs), such as Wi-Fi networks), a wireless device may utilize a power amplifier (PA) when transmitting a signal. The signal may include one or more spatial streams. The transmitting device, such as an access point (AP) or mobile station (STA), may perform any number of transmitter-side processes on the signal prior to a PA operation. The device may then perform power amplification on the signal and may transmit the signal to a receiving device over an air channel. The received signal at the receiving device may be affected by PA non-linearity distortion based on the power amplification process. To mitigate this distortion, the receiving device may determine a value, referred to as the side channel, corresponding to the air channel and the receiver-side processing, H. To calculate the side channel H, the receiving device may perform channel estimation per spatial stream in the channel (e.g., $H_{est}$=HG) and may multiply $H_{est}$ by the inverse of G. As G is a matrix of size $N_{tx} \times N_{ss}$, where $N_{tx}$ is the number of transmit antennas and $N_{ss}$ is the number of spatial streams (e.g., space-time streams), the receiving device may not be able to determine an inverse for G if $N_{tx} \neq N_{ss}$. To handle such cases (e.g., if a transmitting device transmits with a number of antennas greater than the number of spatial streams), the wireless devices may implement one or more techniques for estimating the side channel information, H.

In a first example, the transmitting device may implement a multi-user (MU) frame format for transmitting the signal in a packet. For the MU frame format, the transmitting device may select a number of long training field (LTF) symbols for the packet equal to the number of transmit antennas, $N_{tx}$. The transmitting device may use a total number of space-time streams $N_{STS,total}$ equal to the number of transmit antennas, $N_{tx}$, for transmitting the LTF symbols. However, the transmitting device may transmit the data over a subset of the total number of spatial streams, and may assign zero transmit power to the other spatial streams, resulting in transmitting the data transmission in the $N_{ss}$ spatial streams. The dimensions of the G matrix may be based on the number of streams used to transmit the LTF (e.g., the total number of streams $N_{STS,total}$) and the number of transmit antennas, and may accordingly be a full rank square matrix, because $N_{STS,total}=N_{tx}$. A receiving device may use this square G matrix and a channel estimation value to cancel the PA non-linearity distortion.

In a second example, the transmitting device may transmit both a null data packet (NDP) and a data packet. The transmitting device may transmit the NDP using a same number of spatial streams as transmit antennas such that the number of LTFs in the NDP is the same as the number of transmit antennas, and accordingly the receiving device may determine a full rank square matrix G to calculate the side channel information, H. The receiving device may use this calculated H value for the NDP when receiving a data transmission using the fewer spatial streams than transmit antennas, and may calibrate this value of H for the data transmission. The receiving device may use the calibrated H measurement to mitigate the PA distortion in the data transmission.

In a third example, the transmitting device may implement a single-user (SU) frame format for transmitting the signal in a packet. The transmitting device may modify the LTF in the SU format to support side channel estimation at the receiving device. For example, the transmitting device may include a number of LTF symbols equal to the number of transmit antennas, $N_{tx}$, in the SU frame, and may transmit these LTF symbols using a number of spatial streams equal to the number of transmit antennas. The receiving device may determine the side channel, H, for distortion correction based on performing channel estimation when processing the LTF. For example, the receiving device may determine $H_{ltf}$ during LTF receiver-side processing, and may calculate the side channel H for the data transmission based on $H=H_{ltf}*inv(G_{ltf})$, where $G_{ltf}$ has the dimensions $N_{tx} \times N_{tx}$ due to selecting the same number of LTF symbols as transmit antennas, and transmitting these LTF symbols using the same number of spatial streams as transmit antennas.

A wireless device (e.g., an AP or STA) may utilize one or more of the above techniques to estimate side channel information at a receiver. This side channel information may in turn be used to mitigate or cancel PA distortion of a received signal, which may improve the accuracy of signal processing at a receiver.

Aspects of the disclosure are initially described in the context of wireless communications systems. Additional aspects of the disclosure are described with respect to techniques and processes for estimating side channel information. Aspects of the disclosure are further illustrated by and described with reference to apparatus diagrams, system diagrams, and flowcharts that relate to transmitter schemes to facilitate side channel information estimation.

FIG. 1 illustrates a WLAN 100 (also known as a Wi-Fi network) configured in accordance with various aspects of the present disclosure. The WLAN 100 may include an AP 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated stations 115 may represent a basic service set (BSS) or an extended service set (ESS). The various STAs 115 in the network may communicate with one another through the AP 105. Also shown is a coverage area 110 of the AP 105, which may represent a basic service area (BSA) of the WLAN 100. An extended network station (not shown) associated with the WLAN 100 may be connected to a wired or wireless distribution system that may allow multiple APs 105 to be connected in an ESS. The WLAN 100 may support, for one or more APs 105 and STAs 115, transmitter schemes to facilitate side channel information estimation.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and medium access control (MAC) layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within WLAN 100.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention-based environment (e.g., an environment supporting carrier sense multiple access/carrier aggregation (CSMA/CA)) because the STAs 115 may not refrain from transmitting on top of each other. A STA 115 whose transmissions are not identifiable, but that is within the same coverage area 110 may be known as a hidden node. CSMA/CA may be supplemented by the exchange of a request to send (RTS) packet transmitted by a sending STA 115 (or AP 105) and a clear to send (CTS) packet transmitted by the receiving STA 115 (or AP 105). This may alert other devices within range of the sender and receiver not to transmit for the duration of the primary transmission. Thus, RTS/CTS may help mitigate a hidden node problem.

In some WLANs 100, a wireless device, which may be referred to as a transmitting device, may identify a number of spatial streams for data transmission. This number of spatial streams may be less than a number of transmit antennas for the transmission. The transmitting device, which may be an AP 105 or STA 115, may generate a packet for transmission, including an LTF. The LTF may contain a number of symbols (e.g., orthogonal frequency division multiplexing (OFDM) symbols) equal to the number of transmit antennas for the data transmission. In a first aspect, the packet may be formatted in an MU frame format, with the same number of LTF symbols as transmit antennas. In a second aspect, the packet may be an NDP, and the transmitting device may transmit a data packet in addition to the NDP. In a third aspect, the packet may be formatted in an SU frame format with a modified LTF. A receiving device (e.g., an AP 105 or STA 115) may receive the packet and may determine a channel estimation per spatial stream based on the received packet. This receiving device may use this channel estimation to mitigate PA distortion in received data transmissions.

Figure 2:
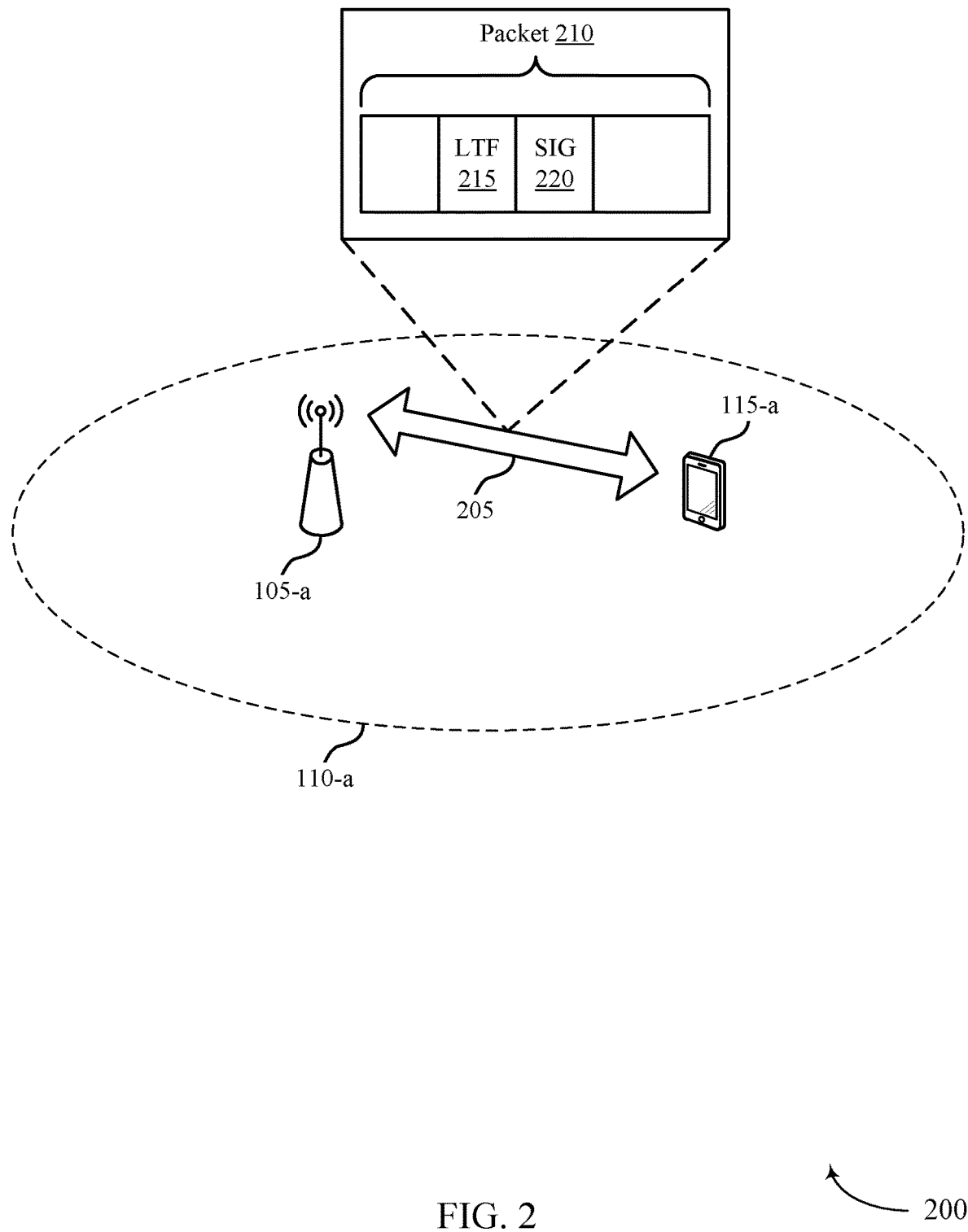
FIG. 2 illustrates an example of a wireless communications system that supports transmitter schemes to facilitate side channel information estimation in accordance with various aspects of the present disclosure.

FIG. 2 illustrates an example of a wireless communications system 200 that supports transmitter schemes to facilitate side channel information estimation in accordance with various aspects of the present disclosure. The wireless communications system 200 may include AP 105-a, providing coverage for geographic coverage area 110-a, and STA 115-a, which may be examples of the devices and areas described with reference to FIG. 1. AP 105-a and STA 115-a may communicate with one another via communication link 205. In some cases, AP 105-a or STA 115-a may transmit a packet 210, which may include an LTF 215, a SIG 220, or any other number of fields, including but not limited to a short training field (STF) and a data field. AP 105-a or STA 115-a may transmit the packet 210 utilizing a scheme to support side channel estimation at the receiving device.

In some wireless communications systems 200, when a wireless device (e.g., an AP 105 or STA 115) transmits an OFDM signal, the signal may be sent through a PA. Sending the signal through the PA may result in distortion of the signal due to the non-linearity of the power amplification operations. A receiver at a wireless device receiving the signal may perform system modeling to estimate the PA non-linearity distortion, and may perform distortion correction on the signal based on the estimated value for the PA non-linearity distortion.

The receiving device may reconstruct the signal in order to estimate the distortion cost of the PA. In some cases, the system modeling for a received signal, Y, can be represented as:

$$Y=HGS+H*I(GS)+N=HGS+H*D+N \quad (1)$$

where S represents the desired signal, D=I(GS) represents the PA distortion, and N represents any noise on the channel. The receiver may estimate these parameters, or may receive indications of these parameters in a signal, in order to correct the distortion, D.

More particularly, H may correspond to the air channel, along with any receiver-side processing or procedures performed on the signal. This value, H, may be referred to as the "side channel" or "partial channel" measurement. G may correspond to transmitter-side processing or any other procedures performed on the signal, and S may corresponds to the transmitted signal. Some examples of transmitter-side processing, G, may include modulating the signal, performing an inverse fast Fourier transform (IFFT), passing the signal through a transmission filter, or any other signal processing at the transmitting device. The PA may be the final transmitter process performed on the signal before transmission, and may also be included in the value, G. The dimensions of G may be based on the spatial mapping at the transmitter (e.g., $N_{tx} \times N_{ss}$, where $N_{tx}$ is the number of transmit antennas and $N_{ss}$ is the number of spatial streams for data transmission). Similarly, some examples of receiver-side processing represented in H may include passing the signal through a reception filter, performing a fast Fourier transform (FFT), or any other signal processing until the channel estimation stage at the receiving device. The dimensions of H may be based on the number of transmit antennas sending the signal, and the number receive antennas receiving the signal (e.g., $N_{rx} \times N_{tx}$, where $N_{rx}$ is the number of receive antennas and $N_{tx}$ is the number of transmit antennas).

Due to the order of signal processing, the value HG may modify S, as the signal passes through transmitter-side processing, the air channel, and receiver-side processing. In contrast, the value H may modify the PA distortion D, as the PA may be the last transmitter-side process performed prior to transmission. In such cases, the distortion is not propagated through the transmitter-side processing, and just passes through the air channel and receiver-side processing. Accordingly, the transmitter-side processing variable G may not affect the PA distortion, D, as show in equation 1.

Receiver channel estimation may measure an estimated effective per-spatial stream channel for demodulation (e.g., $H_{est}=HG$), which may be used to determine the transmitted signal, S, based on the received signal, Y. However, to cancel PA distortion, the receiver may use the side channel H per transmit antenna, as opposed to HG. To determine a value for H, the receiver may cancel the transmitter-side processing portion of the channel estimation (e.g., $H=H_{est}*inv(G)$). This equation may calculate the side channel measurement H per transmit antenna if G is a square matrix (e.g., $N_{tx}=N_{ss}$) and full rank, as in such cases the inverse of matrix G exists. However, if the number of transmit antennas and the number of spatial streams are not equal (e.g., if $N_{tx}>N_{ss}$), then G may not be a square matrix (e.g., G may be a tall matrix, where the first dimension of G is greater than the second dimension). In these cases, the inverse of G may not exist, and the receiving device may not determine the side channel, H, using $H=H_{est}*inv(G)$.

The wireless device may instead utilize one or more techniques to determine the side channel information H when the number of transmit antennas does not equal the number of spatial streams for data transmission. In a first implementation, a wireless device (e.g., AP 105-a or STA 115-a) may format a packet 210 in an MU frame format. The MU frame formatted packet 210 may include a number of LTF 215 symbols equal to the number of transmit antennas. The transmitting device may transmit the data portions of the packet 210 by assigning a non-zero transmit power to a first set of spatial streams of size $N_{ss}$, and may assign zero transmit power to a second set of spatial streams, where an aggregate of the first and second sets of spatial streams form a total set of spatial streams $N_{STS,total}$. This total set of spatial streams may include a same number of streams as the number of transmit antennas for the data transmission, and the transmitting device may transmit the LTF 215 symbols using this total set of spatial streams. A receiving wireless device may use a full rank, square G matrix with dimensions $N_{STS,total} \times N_{tx}$ in the equation $H=H_{est}*inv(G)$ to determine the side channel H. In a second implementation, the packet 210 may be an NDP, and the transmitting device may transmit a data packet in addition to the NDP. The transmitting device may use the same number of spatial streams as transmit antennas when transmitting the NDP, and the receiving device may accordingly calculate the side channel, H, for the NDP using the equation $H=H_{est}*inv(G)$. The receiving device may then perform calibration on this side channel value in order to use this value of H for canceling distortion of the data packet. In a third aspect, the packet 210 may be formatted in an SU frame format with a modified LTF. The SU formatted packet 210 may include a number of LTF 215 symbols equal to the number of transmit antennas, and may transmit these LTF 215 symbols using a same number of spatial streams as transmit antennas. The packet 210 may additionally include an indication of the number of LTF 215 symbols or transmit antennas in a SIG field 220. A receiving device may determine the dimensions for a full rank, square G matrix to use in the equation $H=H_{est}*inv(G)$ based on the indicated number of LTF 215 symbols or transmit antennas, which will be equal. The wireless device may use this G matrix to determine the side channel measurement, H, and may use the value of H to cancel or mitigate PA distortion of the data transmission.

Figure 3:
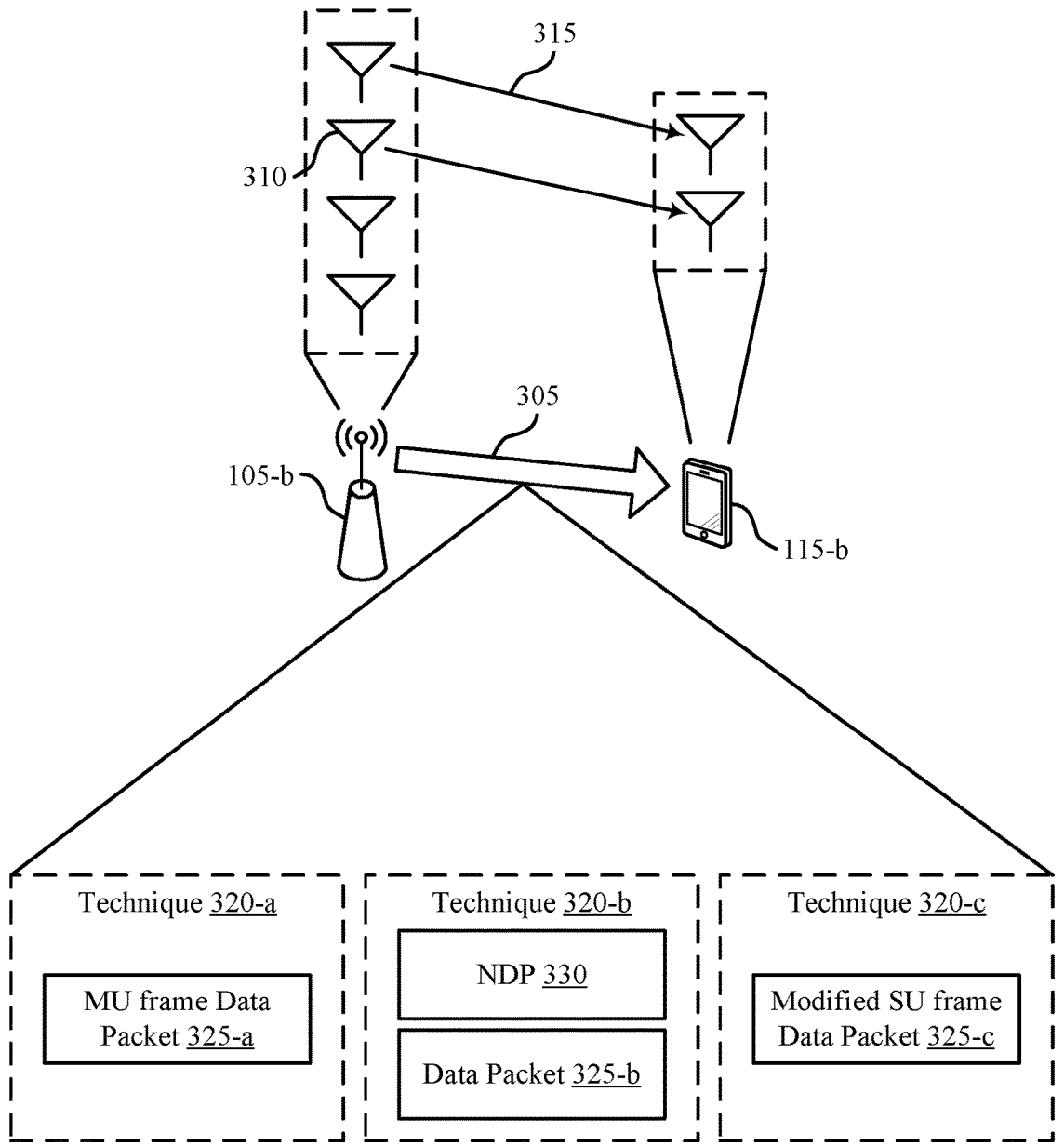
FIG. 3 illustrates examples of different techniques for side channel estimation in a wireless communications system that supports transmitter schemes to facilitate side channel information estimation in accordance with various aspects of the present disclosure.

FIG. 3 illustrates examples of different techniques for side channel estimation in a wireless communications system 300 that supports transmitter schemes to facilitate side channel information estimation in accordance with various aspects of the present disclosure. The wireless communications system 300 may include AP 105-b and STA 115-b, which may be examples of the wireless devices described with reference to FIGS. 1 and 2. In one example, AP 105-b may transmit to STA 115-b on the downlink 305. However, it is to be understood that the following techniques additionally may apply to uplink transmissions from STA 115-b to AP 105-b, or in device-to-device (D2D) transmissions. AP 105-b may transmit data to STA 115-b using fewer transmit antennas 310 than spatial streams 315. For example, AP 105-b may transmit data using four transmit antennas 310 in two spatial streams 315 to STA 115-b. STA 115-b may receive the data transmission using any number of receive antennas 310. In order to mitigate PA distortion present in the data transmission, STA 115-b may implement one or more of the techniques 320 described below.

In a first technique 320-a, the wireless devices may utilize a frame format where the number of LTFs (e.g., the number of LTF symbols) is equal to the number of transmit antenna ($N_{tx}$) used for the transmission (e.g., as opposed to being equal to the number of spatial streams ($N_{ss}$)). For example, the transmitting device (e.g., AP 105-b) may implement an MU frame format for transmitting a data packet 325-a, such as a downlink MU frame format defined for IEEE 802.11ac or a high-efficiency (HE) MU frame format defined for IEEE 802.11ax. AP 105-b may utilize such an MU frame data packet 325-a in both MU and SU cases. The MU frame format may allow multiple devices to transmit simultaneously, where each of the devices may occupy a set of spatial streams 315. In IEEE 802.11ac or 802.11ax, the MU frame may include a number of LTFs equal to the total number of spatial streams 315 used by the multiple wireless devices. The wireless devices may use these LTFs to cancel or reduce distortion associated with the spatial streams 315 of the other devices.

Rather than include a number of LTFs in the MU frame data packet 325-a equal to the total number of spatial streams 315, the AP 105-b may instead include a number of LTFs equal to the number of transmit antennas 310. The data portion of the MU frame data packet 325-a may remain the same as in the IEEE 802.11ac or 802.11ax protocols. To transmit this number of LTF symbols, AP 105-b may set the total number of space-time streams for transmission ($N_{STS,total}$) equal to the number of transmit antennas 310. As STA 115-b may not be configured to receive this number of streams, AP 105-b may assign a set of transmit antennas 310 to transmit using a non-zero power (e.g., as illustrated, two of the transmit antennas 310 in order to transmit $N_{ss}$ spatial streams 315) and may assign the rest of the transmit antennas 310 (e.g., $N_{STS,total}-N_{ss}$ transmit antennas 310) to transmit using zero power. In some cases, the transmitting device may utilize a random subset of $N_{ss}$ streams of the total set of $N_{STS,total}$ streams for data transmission, while in other cases the transmitting device may select the subset of $N_{ss}$ streams based on set stream selection locations (e.g., the first $N_{ss}$ streams of the total set of streams, the last $N_{ss}$ streams of the total set of streams, etc.).

In some cases, a receiving device (e.g., STA 115-b) receiving the MU frame data packet 325-a may determine the PA distortion without performing any calibration. For example, STA 115-b may perform the calculation $H=H_{est}*inv(G)$ in order to determine the side channel information, H. Rather than use the tall matrix $N_{tx} \times N_{ss}$ for G, the receiving device may use a full rank square matrix $N_{tx} \times N_{STS,total}$, as the total number of space-time streams, $N_{STS,total}$, is equal to the number of transmit antennas. For example, ignoring estimation noise, STA 115-b may determine $H_{est}=HG$ in LTF processing, where G has the dimensions $N_{tx} \times N_{tx}$. This LTF $H_{est}$ matrix may include a column for each spatial stream 315 of the total set of space-time streams. STA 115-b may select the columns of $H_{est}$ corresponding to the spatial streams 315 for data transmission, and these columns may form the channel estimation matrix for data demodulation/equalization, $H_{est,data}$. That is, the estimated channel for data demodulation, $H_{est,data}$, will have dimensions $N_{tx} \times N_{ss}$. To determine distortion correction for the received data transmission, STA 115-b may calculate $H=H_{est,data}*inv(G)$. In this way, STA 115-b may determine both the channel estimation HG and the side channel estimation H based on a single packet received from AP 105-b, and may use these values to cancel the PA distortion and determine the transmitted signal.

In some cases, AP 105-b and STA 115-b may utilize a precoding or spatial extensions matrix, Q. This precoding matrix Q may be an example of an orthogonal matrix, and Q may be pre-determined at both the transmitting device and the receiving device. AP 105-b may use the precoding matrix to evenly spread transmit power across the transmit antennas 310 (e.g., when $N_{tx}>N_{ss}$). In some cases, AP 105-b may spread the transmit power across the complete set of transmit antennas 310. In other cases, AP 105-b may spread the transmit power across the transmit antennas 310 assigned non-zero transmit power. The receiving device (e.g., STA 115-b) may use the same precoding matrix Q in receiver-side processes to determine the transmitted signals.

In second technique 320-b, AP 105-b may transmit an NDP 330 separately from the data packet 325-b. For example, AP 105-b may transmit the NDP 330 using a same number of spatial streams 315 as transmit antennas 310. STA 115-b may receive the NDP 330, and may calculate the side channel measurement H based on the NDP 330. That is, because the NDP 330 is transmitted with $N_{ss,NDP}=N_{tx}$, STA 115-b may determine a full rank, square matrix $G_{NDP}$ of dimensions $N_{tx} \times N_{ss,NDP}$. STA 115-b may use this square matrix to calculate $H=H_{est,NDP}*inv(G_{NDP})$, and may store this side channel estimation, H, in memory.

When STA 115-b receives the data packet 325-b, STA 115-b may retrieve this computed value for H from memory. Performing standard channel estimation for the data packet 325-b, STA 115-b may calculate $H_{est,data}=HG_{data}$. To cancel the PA distortion for the data packet 325-b, STA 115-b may simply use the retrieved value, H, or may perform calibration to more accurately estimate H for the data packet 325-b. That is, as STA 115-b measures a first channel from the NDP 330 and a second channel from the data packet 325-b, STA 115-b may calibrate the measured channels (e.g., using a least-squares estimate due to the different dimensions). STA 115-b may perform this calibration to reduce the effects of different automatic gain control (AGC) settings, timing differences, frequency differences, phase differences, or any combination of these differences. In some cases, the side channel value H measured using the NDP 330 may include inaccuracies due to actual training or calibration functions, or due to PA distortion of the measured $H_{est,data}$ value. STA 115-b may ignore these inaccuracies or may perform further calibration to reduce these inaccuracies.

In a third technique 320-c, AP 105-b may transmit an NDP using a modified LTF in an SU frame format. For example, AP 105-b may generate a modified SU frame data packet 325-c, where AP 105-b may set the number of LTF symbols and the number of spatial streams for transmitting the LTF symbols, $N_{ss,ltf}$, equal to the number of transmit antennas 310, $N_{tx}$. Accordingly, a receiving device (e.g., STA 115-b) may utilize a full rank, square matrix $G_{ltf}$ with dimensions $N_{tx} \times N_{tx}$ to calculate the side channel estimation, H, as $N_{ss,ltf}=N_{tx}$. At LTF processing, STA 115-b may determine a channel estimate $H_{ltf}=HG_{ltf}$.

For data demodulation with $N_{ss}$ spatial streams 315, STA 115-b may estimate $H_{est}=HG_{data}$ using the values determined at LTF processing. For example, STA 115-b may use the equation $H_{est}=H_{ltf}*inv(G_{ltf})*G_{data}$ to determine the data demodulation channel estimate $H_{est}$, where $G_{data}$ is a tall matrix of dimensions $N_{tx} \times N_{ss}$. To perform PA distortion correction, STA 115-b may determine the side channel estimate, H, based on $H=H_{ltf}*inv(G_{ltf})$. In technique 320-c, STA 115-b may not perform any calibration to determine the PA distortion, but performing $inv(G_{ltf})*G_{data}$ to determine the channel estimate for data demodulation may introduce complexity into the system.

Additionally, in some cases, AP 105-*b* may include an indication of the number of transmit antennas 310 or the number of LTF symbols—which may be the same number—in the modified SU frame data packet 325-*c*. For example, AP 105-*b* may modify a signaling (SIG) field in the modified SU frame data packet 325-*c* to include an indication of this number. STA 115-*b* receiving the modified SU frame data packet 325-*c* may determine the number of transmit antennas 310 and the number of LTF symbols based on this indication in the SIG field.

In any of the above techniques 320, AP 105-*b* and STA 115-*b* may utilize a pre-coding matrix, Q, during transmitter and receiver side processing. Additionally or alternatively, when determining a number of LTF symbols for a packet 325, a wireless device may round the number of LTF symbols up to the nearest value that has a corresponding P-matrix available in memory (e.g., 2, 4, 8, etc.).

Figure 4:
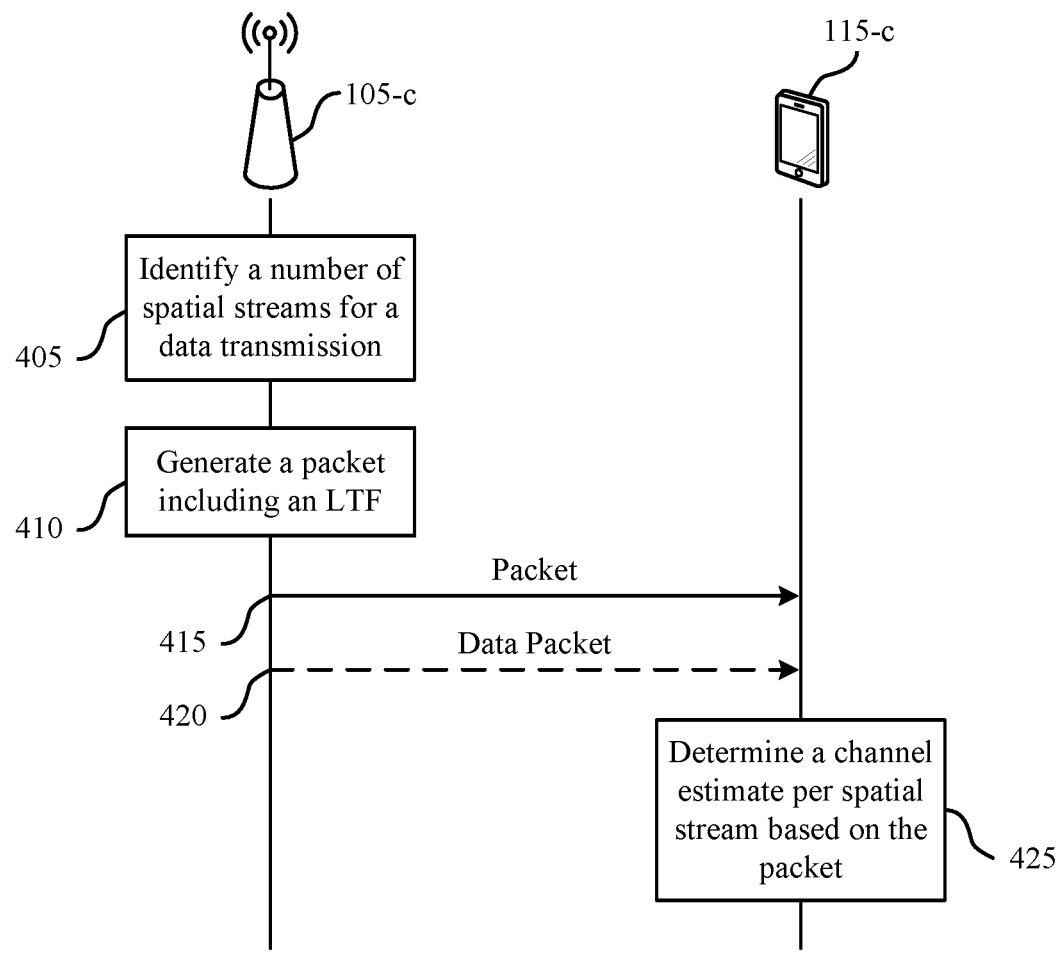
FIG. 4 illustrates an example of a process flow that supports transmitter schemes to facilitate side channel information estimation in accordance with various aspects of the present disclosure.

FIG. 4 illustrates an example of a process flow 400 that supports transmitter schemes to facilitate side channel information estimation in accordance with various aspects of the present disclosure. The process flow 400 may include an AP 105-*c* and an STA 115-*c*, which may be examples of the corresponding devices described with reference to FIGS. 1 through 3. AP 105-*c* and STA 115-*c* may implement transmitter schemes to facilitate side channel information estimation at a receiver. As illustrated, AP 105-*c* may transmit data to STA 115-*c*, and STA 115-*c* may determine PA non-linearity distortion in the data based on the transmitter scheme. Although illustrated with AP 105-*c* as the transmitting device and STA 115-*c* as the receiving device, it should be understood that the described process flow 400 may also apply to STA 115-*c* transmitting data to AP 105-*c*.

At 405, AP 105-*c* may identify a number of spatial streams for a data transmission. The identified number of spatial streams may be different (e.g., fewer) than a number of transmit antennas for the data transmission.

At 410, AP 105-*c* may generate a packet including an LTF. The LTF may contain a number of OFDM symbols, where the number of OFDM symbols is equal to the number of transmit antennas (as opposed to the number of spatial streams for the data transmission). In some cases, the packet may be an example of a data packet. The data packet may be formatted in an MU frame format or may be formatted in a modified SU frame format. In other cases, the packet may be an example of an NDP.

At 415, AP 105-*c* may transmit the packet over a wireless channel to STA 115-*c*. In some cases (e.g., if the packet is a data packet), the packet may contain a data portion. In other cases (e.g., if the packet is an NDP), AP 105-*c* may additionally transmit a data packet to STA 115-*c* at 420.

At 420, STA 115-*c* may determine a channel estimation per spatial stream based on the received packet. STA 115-*c* may receive the data (e.g., either the data portion of the packet, or the separate data packet) based on the determined channel estimation. For example, if the packet and data packet are transmitted separately, STA 115-*c* may perform calibration between the channel estimation for the packet and an additional channel estimation for the data packet. STA 115-*c* may mitigate PA non-linearity distortion in the data based on the channel estimation and the received packet.

Figure 5:
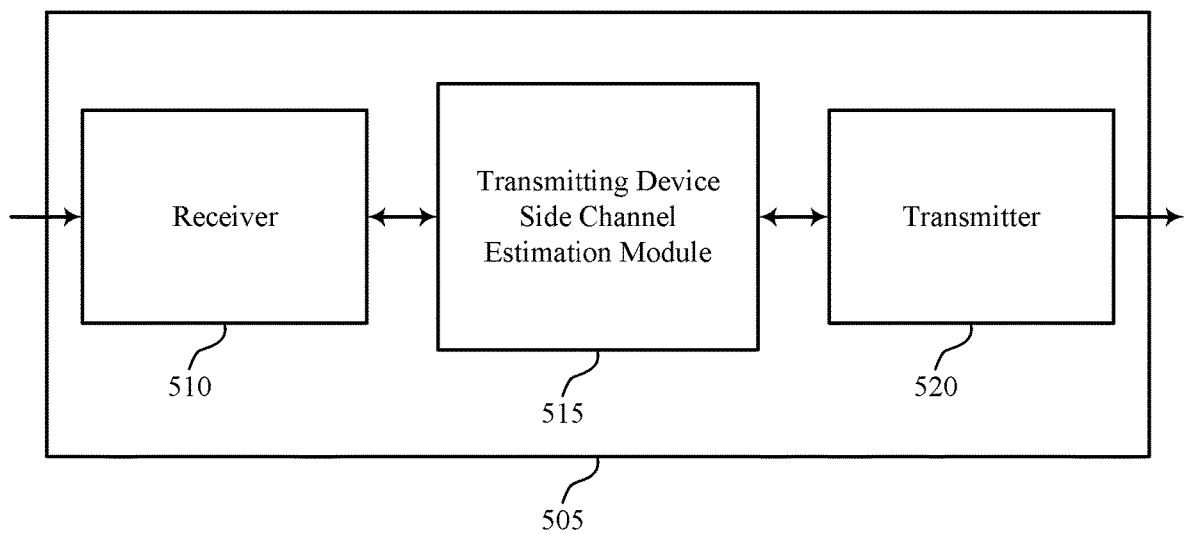
FIGS. 5 and 6 show block diagrams of wireless devices that support transmitter schemes to facilitate side channel information estimation in accordance with various aspects of the present disclosure.

FIG. 5 shows a block diagram 500 of a wireless device 505 that supports transmitter schemes to facilitate side channel information estimation in accordance with various aspects of the present disclosure. Wireless device 505 may be an example of a transmitting device, such as an AP 105 or a STA 115, as described herein. Wireless device 505 may include receiver 510, transmitting device side channel estimation module 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to transmitter schemes to facilitate side channel information estimation, etc.). Information may be passed on to other components of the device. The receiver 510 may be an example of aspects of the transceiver 835 described with reference to FIG. 8. The receiver 510 may utilize a single antenna or a set of antennas.

Transmitting device side channel estimation module 515 may be an example of aspects of the transmitting device side channel estimation module 815 described with reference to FIG. 8.

Transmitting device side channel estimation module 515 and/or at least some of its various sub-components may be implemented in hardware, software executed by a processor, firmware, or any combination thereof. If implemented in software executed by a processor, the functions of the transmitting device side channel estimation module 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The transmitting device side channel estimation module 515 and/or at least some of its various sub-components may be physically located at various positions, including being distributed such that portions of functions are implemented at different physical locations by one or more physical devices. In some examples, transmitting device side channel estimation module 515 and/or at least some of its various sub-components may be a separate and distinct component in accordance with various aspects of the present disclosure. In other examples, transmitting device side channel estimation module 515 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

Transmitting device side channel estimation module 515 may identify a first number of spatial streams for a data transmission, and generate a packet including an LTF, the LTF including a number of OFDM symbols that is equal to a number of transmit antennas for the data transmission, where the number of transmit antennas for the data transmission is greater than the first number of spatial streams for the data transmission. Transmitting device side channel estimation module 515 may transmit the packet over a wireless channel, where the LTF is transmitted using a second number of spatial streams equal to the number of transmit antennas.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
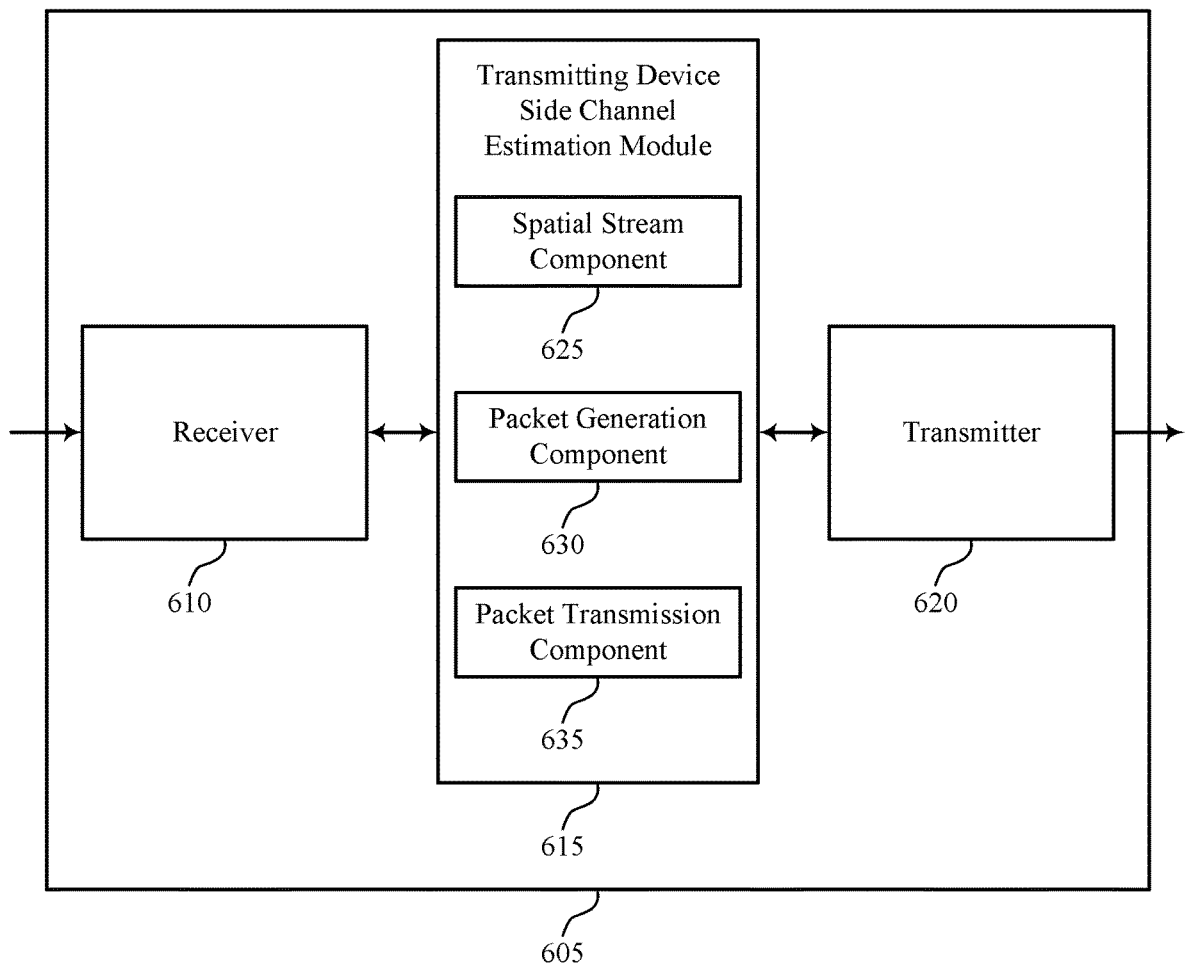

FIG. 6 shows a block diagram 600 of a wireless device 605 that supports transmitter schemes to facilitate side channel information estimation in accordance with various aspects of the present disclosure. Wireless device 605 may be an example of aspects of a wireless device 505 or a transmitting device, such as an AP 105 or a STA 115, as described with reference to FIGS. 1 through 5. Wireless device 605 may include receiver 610, transmitting device side channel estimation module 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to transmitter schemes to facilitate side channel information estimation, etc.). Information may be passed on to other components of the device. The receiver 610 may be an example of aspects of the transceiver 835 described with reference to FIG. 8. The receiver 610 may utilize a single antenna or a set of antennas.

Transmitting device side channel estimation module 615 may be an example of aspects of the transmitting device side channel estimation module 815 described with reference to FIG. 8. Transmitting device side channel estimation module 615 may also include spatial stream component 625, packet generation component 630, and packet transmission component 635.

Spatial stream component 625 may identify a first number of spatial streams for a data transmission. In some cases, the spatial streams for the data transmission may be examples of a first set of spatial streams. In these cases, spatial stream component 625 may further assign a non-zero transmit power to the first set of spatial streams for the data transmission, and may assign zero transmit power to a second set of spatial streams for the data transmission, where a total number of spatial streams including the first set of spatial streams and the second set of spatial streams is equal to a second number of spatial streams for the LTF transmission.

Packet generation component 630 may generate a packet including an LTF, the LTF including a number of OFDM symbols that is equal to a number of transmit antennas for the data transmission, where the number of transmit antennas for the data transmission is greater than the first number of spatial streams for the data transmission.

Packet transmission component 635 may transmit the packet over a wireless channel, where the LTF is transmitted using the second number of spatial streams for the LTF transmission. In some cases, the packet is an NDP, and transmitting the packet may include transmitting the packet using a same number of spatial streams as transmit antennas. In some cases, packet transmission component 635 may transmit a data packet using the first number of spatial streams and the transmit antennas.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
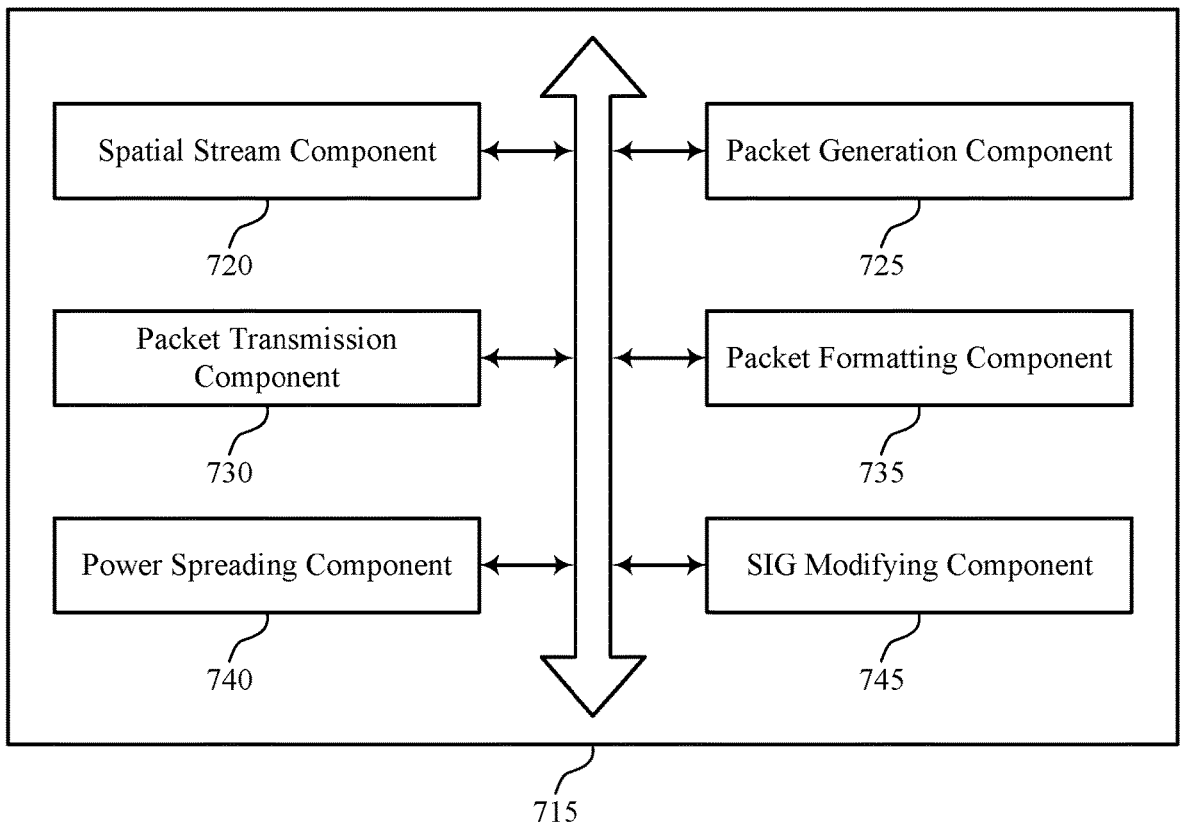
FIG. 7 shows a block diagram of a transmitting device side channel estimation module that supports transmitter schemes to facilitate side channel information estimation in accordance with various aspects of the present disclosure.

FIG. 7 shows a block diagram 700 of a transmitting device side channel estimation module 715 that supports transmitter schemes to facilitate side channel information estimation in accordance with various aspects of the present disclosure. The transmitting device side channel estimation module 715 may be an example of aspects of a transmitting device side channel estimation module 515, a transmitting device side channel estimation module 615, or a transmitting device side channel estimation module 815 described with reference to FIGS. 5, 6, and 8. The transmitting device side channel estimation module 715 may include spatial stream component 720, packet generation component 725, packet transmission component 730, packet formatting component 735, power spreading component 740, and SIG modifying component 745. Each of these modules may communicate, directly or indirectly, with one another (e.g., via one or more buses).

Spatial stream component 720 may identify a first number of spatial streams for a data transmission. In some cases, the spatial streams for the data transmission may be examples of a first set of spatial streams. In these cases, spatial stream component 720 may further assign a non-zero transmit power to the first set of spatial streams for the data transmission, and may assign zero transmit power to a second set of spatial streams for the data transmission, where a total number of spatial streams including the first set of spatial streams and the second set of spatial streams is equal to a second number of spatial streams.

Packet generation component 725 may generate a packet including an LTF, the LTF including a number of OFDM symbols that is equal to a number of transmit antennas for the data transmission, where the number of transmit antennas for the data transmission is greater than the first number of spatial streams for the data transmission.

Packet transmission component 730 may transmit the packet over a wireless channel, where the LTF is transmitted using the second number of spatial streams equal to the number of transmit antennas. In some cases, the packet is an NDP, and transmitting the packet may include transmitting the packet using the second number of spatial streams. In some cases, packet transmission component 730 may transmit a data packet using the first number of spatial streams and the transmit antennas.

Packet formatting component 735 may format the packet in a multi-user frame format. Power spreading component 740 may spread a transmit power for the data transmission over a set of the transmit antennas using a pre-coding matrix. In some cases, the transmit power is spread evenly across the set of the transmit antennas. In some cases, the pre-coding matrix may be an example of an orthogonal matrix.

SIG modifying component 745 may modify a SIG field for the packet. For example, in some cases, the packet further includes a modified SIG field, the modified SIG field including an indication of the number of transmit antennas, the number of OFDM symbols for the LTF, or both.

Figure 8:
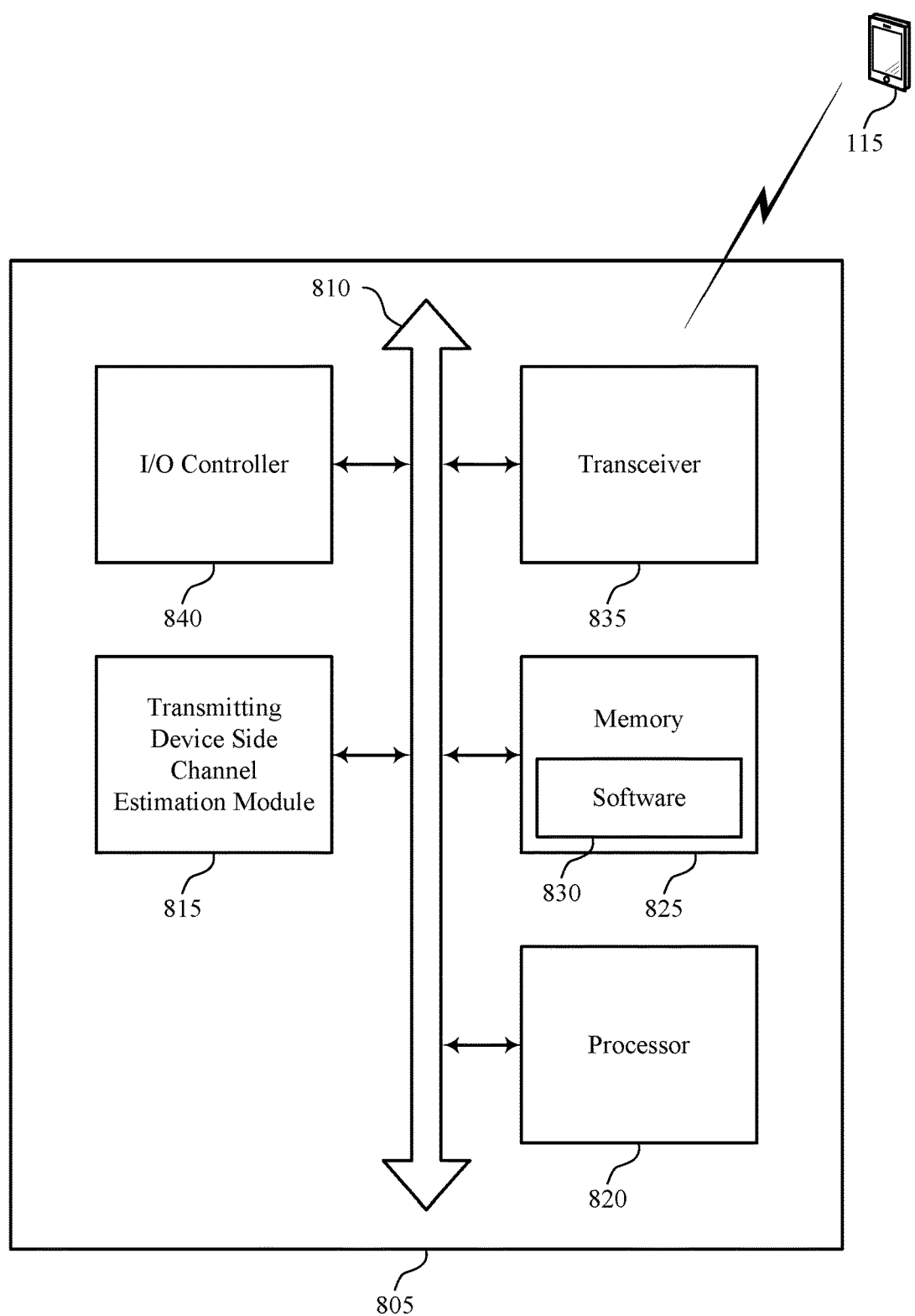
FIG. 8 shows a diagram of a system including a device that supports transmitter schemes to facilitate side channel information estimation in accordance with various aspects of the present disclosure.

FIG. 8 shows a diagram of a system 800 including a device 805 that supports transmitter schemes to facilitate side channel information estimation in accordance with various aspects of the present disclosure. Device 805 may be an example of or include the components of wireless device 505, wireless device 605, or a transmitting device, such as an AP 105 or a STA 115, as described above, e.g., with reference to FIGS. 1 through 6. Device 805 may include components for bi-directional voice and data communications including components for transmitting and receiving communications, including transmitting device side channel estimation module 815, processor 820, memory 825, software 830, transceiver 835, and I/O controller 840. These components may be in electronic communication via one or more buses (e.g., bus 810).

Processor 820 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting transmitter schemes to facilitate side channel information estimation).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement various aspects of the present disclosure, including code to support transmitter schemes to facilitate side channel information estimation. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver (e.g., a transceiver at an AP 105 or a STA 115). The transceiver 835 may also include a modem to modulate the packets and provide the modulated packets to the antennas for transmission, and to demodulate packets received from the antennas.

I/O controller 840 may manage input and output signals for device 805. I/O controller 840 may also manage peripherals not integrated into device 805. In some cases, I/O controller 840 may represent a physical connection or port to an external peripheral. In some cases, I/O controller 840 may utilize an operating system such as iOS®, ANDROID®, MS-DOS®, MS-WINDOWS®, OS/2®, UNIX®, LINUX®, or another known operating system. In other cases, I/O controller 840 may represent or interact with a modem, a keyboard, a mouse, a touchscreen, or a similar device. In some cases, I/O controller 840 may be implemented as part of a processor. In some cases, a user may interact with device 805 via I/O controller 840 or via hardware components controlled by I/O controller 840.

Figure 9:
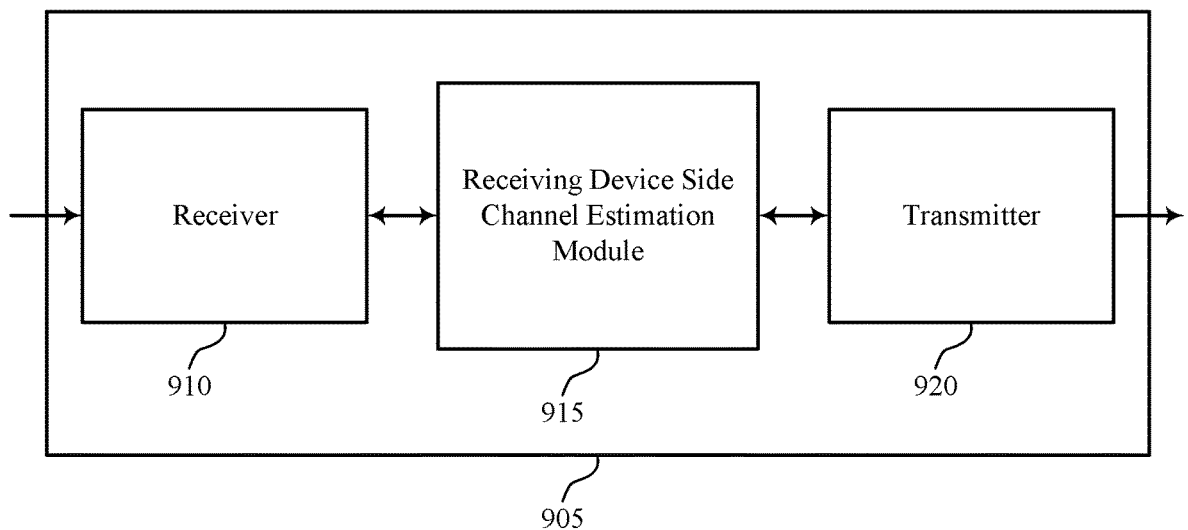
FIGS. 9 and 10 show block diagrams of wireless devices that support transmitter schemes to facilitate side channel information estimation in accordance with various aspects of the present disclosure.

FIG. 9 shows a block diagram 900 of a wireless device 905 that supports transmitter schemes to facilitate side channel information estimation in accordance with various aspects of the present disclosure. Wireless device 905 may be an example of aspects of a receiving device, such as a STA 115 or AP 105, as described herein. In some cases, the receiving device may additionally include the functionality described with respect to a transmitting device (e.g., as described with reference to FIGS. 5 through 8). Wireless device 905 may include receiver 910, receiving device side channel estimation module 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to transmitter schemes to facilitate side channel information estimation, etc.). Information may be passed on to other components of the device. The receiver 910 may be an example of aspects of the transceiver 1235 described with reference to FIG. 12. The receiver 910 may utilize a single antenna or a set of antennas.

Receiving device side channel estimation module 915 may be an example of aspects of the receiving device side channel estimation module 1215 described with reference to FIG. 12.

Receiving device side channel estimation module 915 and/or at least some of its various sub-components may be implemented in hardware, software executed by a processor, firmware, or any combination thereof. If implemented in software executed by a processor, the functions of the receiving device side channel estimation module 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The receiving device side channel estimation module 915 and/or at least some of its various sub-components may be physically located at various positions, including being distributed such that portions of functions are implemented at different physical locations by one or more physical devices. In some examples, receiving device side channel estimation module 915 and/or at least some of its various sub-components may be a separate and distinct component in accordance with various aspects of the present disclosure. In other examples, receiving device side channel estimation module 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Receiving device side channel estimation module 915 may receive a packet including an LTF, the LTF including a number of OFDM symbols that is equal to a number of transmit antennas for a data transmission, where the number of transmit antennas for the data transmission is greater than a number of spatial streams for the data transmission. Receiving device side channel estimation module 915 may additionally determine a channel estimation per spatial stream of the number of spatial streams based on the received packet and may further receive the data transmission based on the determined channel estimation.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
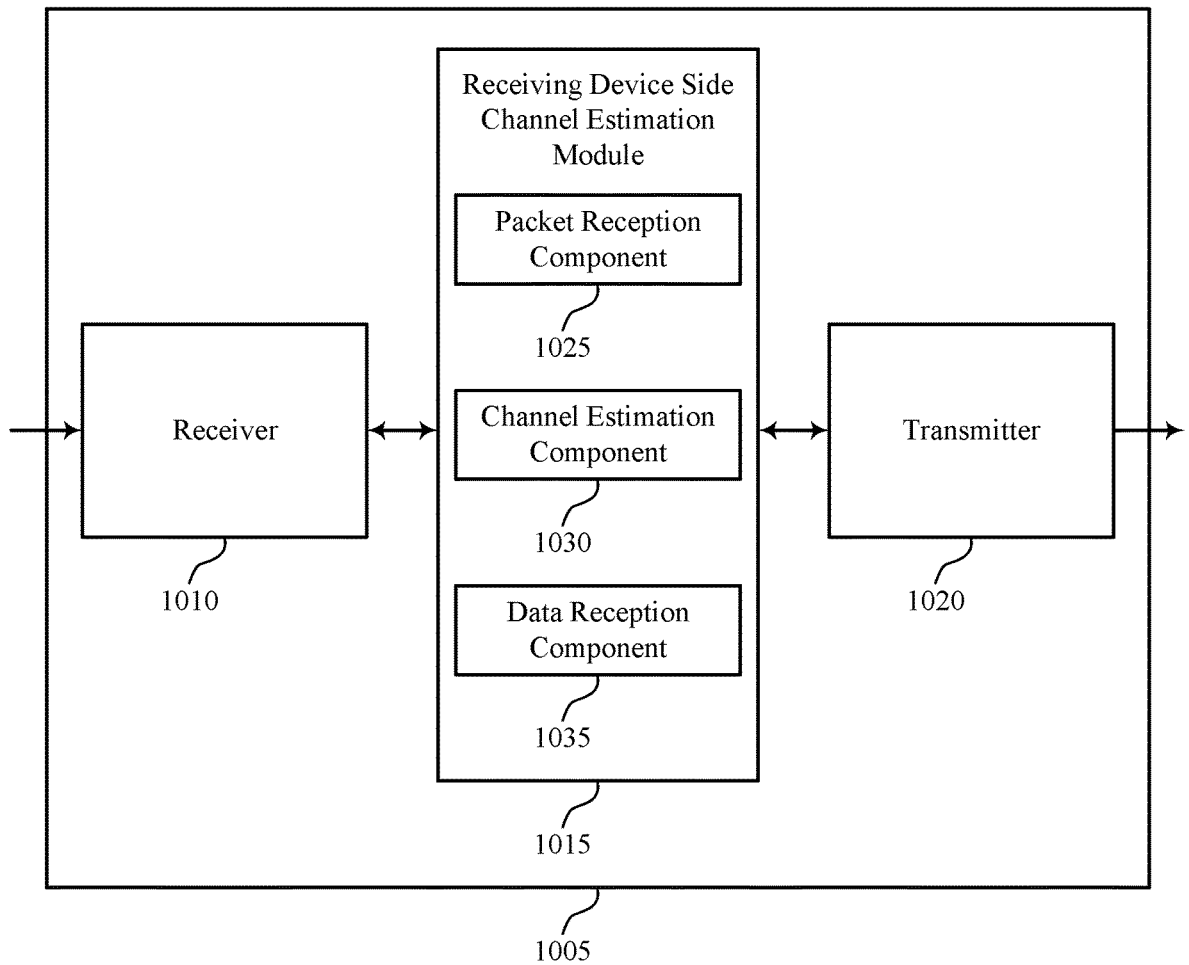

FIG. 10 shows a block diagram 1000 of a wireless device 1005 that supports transmitter schemes to facilitate side channel information estimation in accordance with various aspects of the present disclosure. Wireless device 1005 may be an example of aspects of a wireless device 905 or a receiving device, such as a STA 115 or an AP 105, as described with reference to FIGS. 1 through 5 and 9. Wireless device 1005 may include receiver 1010, receiving device side channel estimation module 1015, and transmitter 1020. Wireless device 1005 may also include a processor.

Each of these components may be in communication with one another (e.g., via one or more buses).

Receiver 1010 may receive information such as packets, user data, or control information associated with various information channels (e.g., control channels, data channels, and information related to transmitter schemes to facilitate side channel information estimation, etc.). Information may be passed on to other components of the device. The receiver 1010 may be an example of aspects of the transceiver 1235 described with reference to FIG. 12. The receiver 1010 may utilize a single antenna or a set of antennas.

Receiving device side channel estimation module 1015 may be an example of aspects of the receiving device side channel estimation module 1215 described with reference to FIG. 12. Receiving device side channel estimation module 1015 may also include packet reception component 1025, channel estimation component 1030, and data reception component 1035.

Packet reception component 1025 may receive a packet including an LTF, the LTF including a number of OFDM symbols that is equal to a number of transmit antennas for a data transmission, where the number of transmit antennas for the data transmission is greater than a number of spatial streams for the data transmission. Packet reception component 1025 may receive the LTF in a different number of spatial streams equal to the number of transmit antennas. In some cases, the received packet is formatted in a multi-user frame format. In some cases, the received packet is an NDP, and receiving the packet includes receiving the packet in a packet transmission using a same number of spatial streams as transmit antennas for the packet transmission.

Channel estimation component 1030 may determine a channel estimation per spatial stream of the number of spatial streams based on the received packet. Data reception component 1035 may receive the data transmission based on the determined channel estimation.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
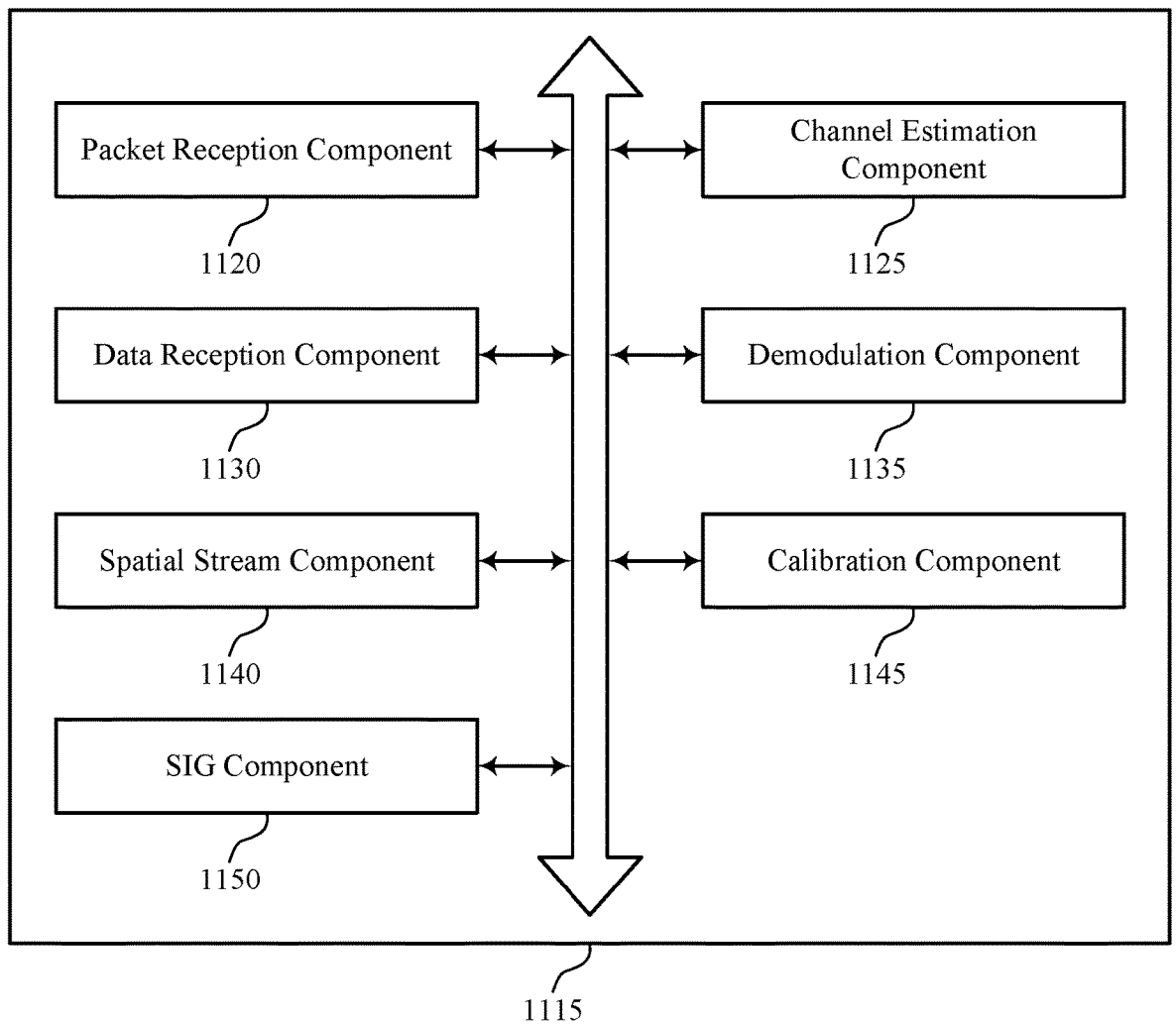
FIG. 11 shows a block diagram of a receiving device side channel estimation module that supports transmitter schemes to facilitate side channel information estimation in accordance with various aspects of the present disclosure.

FIG. 11 shows a block diagram 1100 of a receiving device side channel estimation module 1115 that supports transmitter schemes to facilitate side channel information estimation in accordance with various aspects of the present disclosure. The receiving device side channel estimation module 1115 may be an example of aspects of a receiving device side channel estimation module 1215 described with reference to FIGS. 9, 10, and 12. The receiving device side channel estimation module 1115 may include packet reception component 1120, channel estimation component 1125, data reception component 1130, demodulation component 1135, spatial stream component 1140, calibration component 1145, and SIG component 1150. Each of these modules may communicate, directly or indirectly, with one another (e.g., via one or more buses).

Packet reception component 1120 may receive a packet including an LTF, the LTF including a number of OFDM symbols that is equal to a number of transmit antennas for a data transmission, where the number of transmit antennas for the data transmission is greater than a number of spatial streams for the data transmission. The LTF may be received in a different number of spatial streams equal to the number of transmit antennas. In some cases, the received packet is formatted in a multi-user frame format. In some cases, the received packet is an NDP, and receiving the packet includes receiving the packet in a packet transmission using a same number of spatial streams as transmit antennas for the packet transmission.

Channel estimation component 1125 may determine a channel estimation per spatial stream of the number of spatial streams based on the received packet. Data reception component 1130 may receive the data transmission based on the determined channel estimation.

Demodulation component 1135 may demodulate the received packet using a pre-coding matrix. In some cases, the pre-coding matrix may be an example of an orthogonal matrix.

In some cases, the spatial streams for the data transmission include a subset of spatial streams of a total set of spatial streams, where a size of the total set of spatial streams is equal to the number of transmit antennas. In these cases, spatial stream component 1140 may receive the packet in the subset of spatial streams.

Calibration component 1145 may determine a second channel estimation based on the received data transmission and perform a calibration process on the channel estimation and the second channel estimation. In some cases, performing the calibration process includes performing the calibration process based on a difference between the received packet and the received data transmission in AGC, timing, frequency, phase, or a combination thereof.

In some cases, the packet may further include a modified SIG field. In these cases, SIG component 1150 may determine the number of transmit antennas for the data transmission, the number of OFDM symbols for the LTF, or both based on an indication in the modified SIG field.

Figure 12:
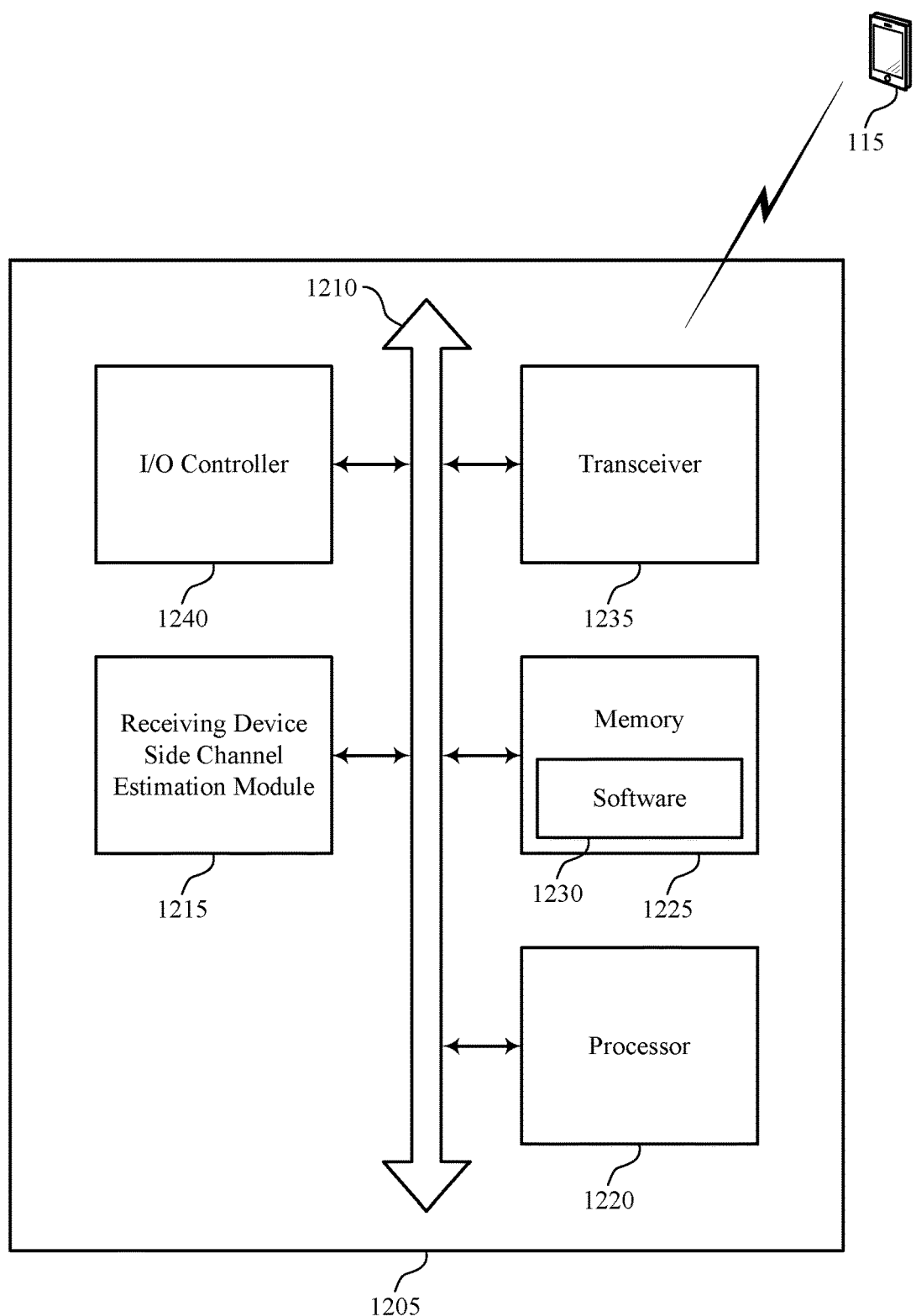
FIG. 12 shows a diagram of a system including a device that supports transmitter schemes to facilitate side channel information estimation in accordance with various aspects of the present disclosure.

FIG. 12 shows a diagram of a system 1200 including a device 1205 that supports transmitter schemes to facilitate side channel information estimation in accordance with various aspects of the present disclosure. Device 1205 may be an example of or include the components of receiving device, such as a STA 115 or AP 105, or a wireless device 905 or 1005 as described above, e.g., with reference to FIGS. 1 through 5, 9, and 10. Device 1205 may include components for bi-directional voice and data communications including components for transmitting and receiving communications, including receiving device side channel estimation module 1215, processor 1220, memory 1225, software 1230, transceiver 1235, and I/O controller 1240. These components may be in electronic communication via one or more buses (e.g., bus 1210).

Processor 1220 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting transmitter schemes to facilitate side channel information estimation).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support transmitter schemes to facilitate side channel information estimation. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver (e.g., a transceiver of an AP 105 or a STA 115). The transceiver 1235 may also include a modem to modulate the packets and provide the modulated packets to the antennas for transmission, and to demodulate packets received from the antennas.

I/O controller 1240 may manage input and output signals for device 1205. I/O controller 1240 may also manage peripherals not integrated into device 1205. In some cases, I/O controller 1240 may represent a physical connection or port to an external peripheral. In some cases, I/O controller 1240 may utilize an operating system such as iOS®, ANDROID®, MS-DOS®, MS-WINDOWS®, OS/2®, UNIX®, LINUX®, or another known operating system. In other cases, I/O controller 1240 may represent or interact with a modem, a keyboard, a mouse, a touchscreen, or a similar device. In some cases, I/O controller 1240 may be implemented as part of a processor. In some cases, a user may interact with device 1205 via I/O controller 1240 or via hardware components controlled by I/O controller 1240.

Figure 13:
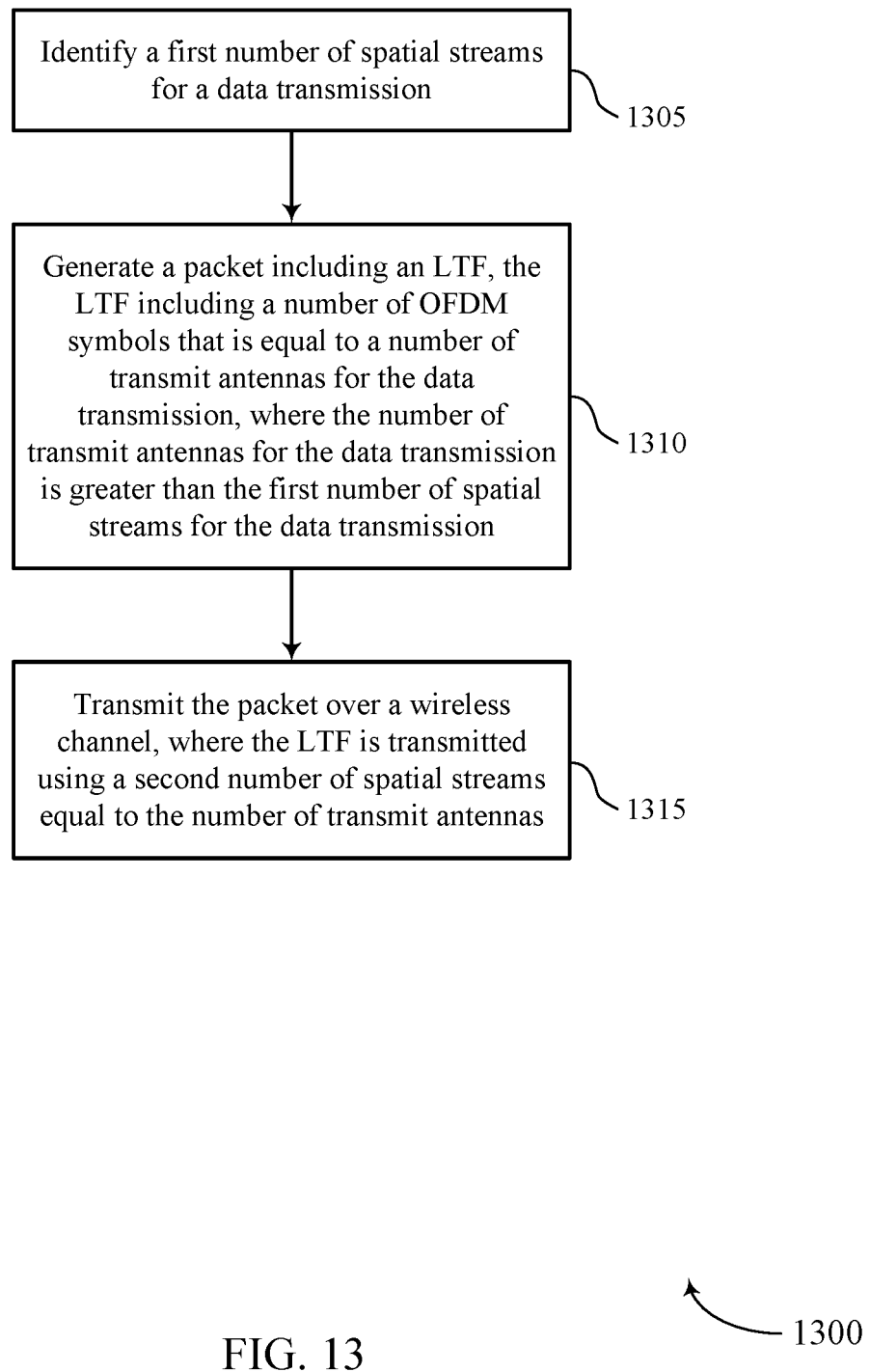
FIGS. 13 through 17 show flowcharts illustrating methods for facilitating side channel information estimation in accordance with various aspects of the present disclosure.

FIG. 13 shows a flowchart illustrating a method 1300 for facilitating side channel information estimation in accordance with various aspects of the present disclosure. The operations of method 1300 may be implemented by a transmitting device, such as an AP 105 or STA 115, or its components as described herein. For example, the operations of method 1300 may be performed by a transmitting device side channel estimation module as described with reference to FIGS. 5 through 8. In some examples, a transmitting device may execute a set of codes to control the functional elements of the device to perform the functions described below. Additionally or alternatively, the transmitting device may perform aspects of the functions described below using special-purpose hardware.

At 1305 the transmitting device may identify a first number of spatial streams for a data transmission. The operations of 1305 may be performed according to the methods described herein. In certain examples, aspects of the operations of 1305 may be performed by a spatial stream component as described with reference to FIGS. 5 through 8.

At 1310 the transmitting device may generate a packet including an LTF, the LTF containing a number of OFDM symbols that is equal to a number of transmit antennas for the data transmission, where the number of transmit antennas for the data transmission is greater than the first number of spatial streams for the data transmission. The operations of 1310 may be performed according to the methods described herein. In certain examples, aspects of the operations of 1310 may be performed by a packet generation component as described with reference to FIGS. 5 through 8.

At 1315 the transmitting device may transmit the packet over a wireless channel, where the LTF is transmitted using a second number of spatial streams equal to the number of transmit antennas. The operations of 1315 may be performed according to the methods described herein. In certain examples, aspects of the operations of 1315 may be performed by a packet transmission component as described with reference to FIGS. 5 through 8.

Figure 14:
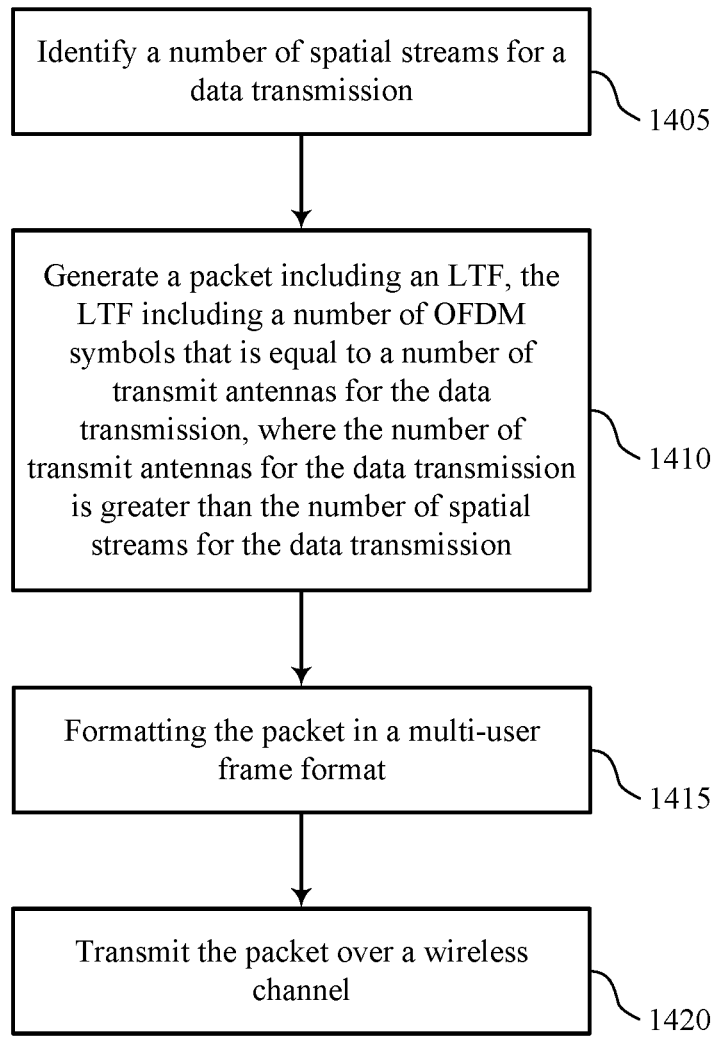

FIG. 14 shows a flowchart illustrating a method 1400 for facilitating side channel information estimation in accordance with various aspects of the present disclosure. The operations of method 1400 may be implemented by a transmitting device, such as an AP 105 or STA 115, or its components as described herein. For example, the operations of method 1400 may be performed by a transmitting device side channel estimation module as described with reference to FIGS. 5 through 8. In some examples, a transmitting device may execute a set of codes to control the functional elements of the device to perform the functions described below. Additionally or alternatively, the transmitting device may perform aspects of the functions described below using special-purpose hardware.

At 1405 the transmitting device may identify a number of spatial streams for a data transmission. The operations of 1405 may be performed according to the methods described herein. In certain examples, aspects of the operations of 1405 may be performed by a spatial stream component as described with reference to FIGS. 5 through 8.

At 1410 the transmitting device may generate a packet including an LTF, the LTF containing a number of OFDM symbols that is equal to a number of transmit antennas for the data transmission, where the number of transmit antennas for the data transmission is greater than the number of spatial streams for the data transmission. The operations of 1410 may be performed according to the methods described herein. In certain examples, aspects of the operations of 1410 may be performed by a packet generation component as described with reference to FIGS. 5 through 8.

At 1415 the transmitting device may format the packet in a multi-user frame format. The operations of 1415 may be performed according to the methods described herein. In certain examples, aspects of the operations of 1415 may be performed by a packet formatting component as described with reference to FIGS. 5 through 8.

At 1420 the transmitting device may transmit the packet over a wireless channel. The operations of 1420 may be performed according to the methods described herein. In certain examples, aspects of the operations of 1420 may be performed by a packet transmission component as described with reference to FIGS. 5 through 8.

Figure 15:
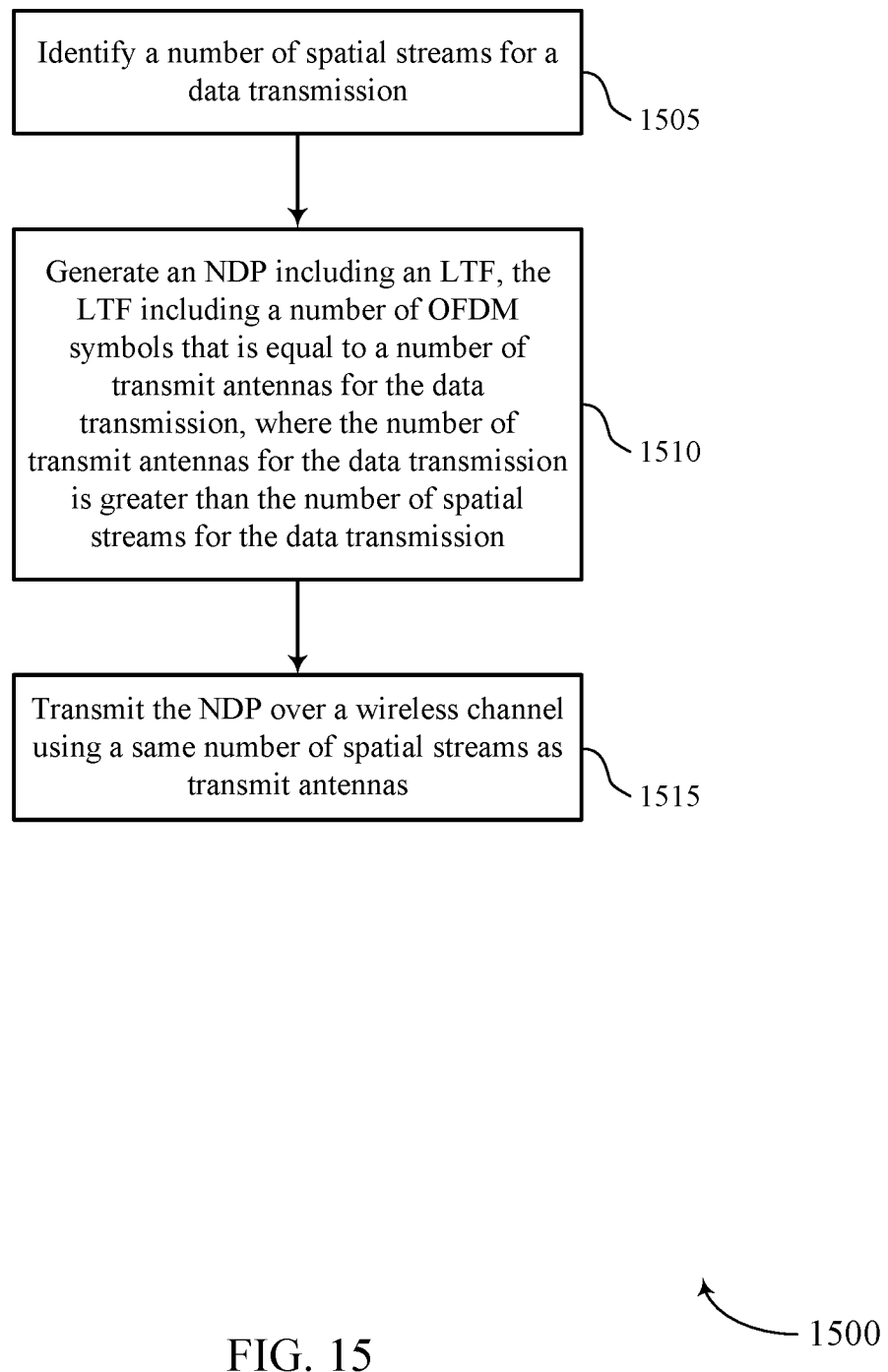

FIG. 15 shows a flowchart illustrating a method 1500 for facilitating side channel information estimation in accordance with various aspects of the present disclosure. The operations of method 1500 may be implemented by a transmitting device, such as an AP 105 or STA 115, or its components as described herein. For example, the operations of method 1500 may be performed by a transmitting device side channel estimation module as described with reference to FIGS. 5 through 8. In some examples, a transmitting device may execute a set of codes to control the functional elements of the device to perform the functions described below. Additionally or alternatively, the transmitting device may perform aspects of the functions described below using special-purpose hardware.

At 1505 the transmitting device may identify a number of spatial streams for a data transmission. The operations of 1505 may be performed according to the methods described herein. In certain examples, aspects of the operations of 1505 may be performed by a spatial stream component as described with reference to FIGS. 5 through 8.

At 1510 the transmitting device may generate an NDP including an LTF, the LTF containing a number of OFDM symbols that is equal to a number of transmit antennas for the data transmission, where the number of transmit antennas for the data transmission is greater than the number of spatial streams for the data transmission. The operations of 1510 may be performed according to the methods described herein. In certain examples, aspects of the operations of 1510 may be performed by a packet generation component as described with reference to FIGS. 5 through 8.

At 1515 the transmitting device may transmit the NDP over a wireless channel using a same number of spatial streams as transmit antennas. The operations of 1515 may be performed according to the methods described herein. In certain examples, aspects of the operations of 1515 may be performed by a packet transmission component as described with reference to FIGS. 5 through 8.

Figure 16:
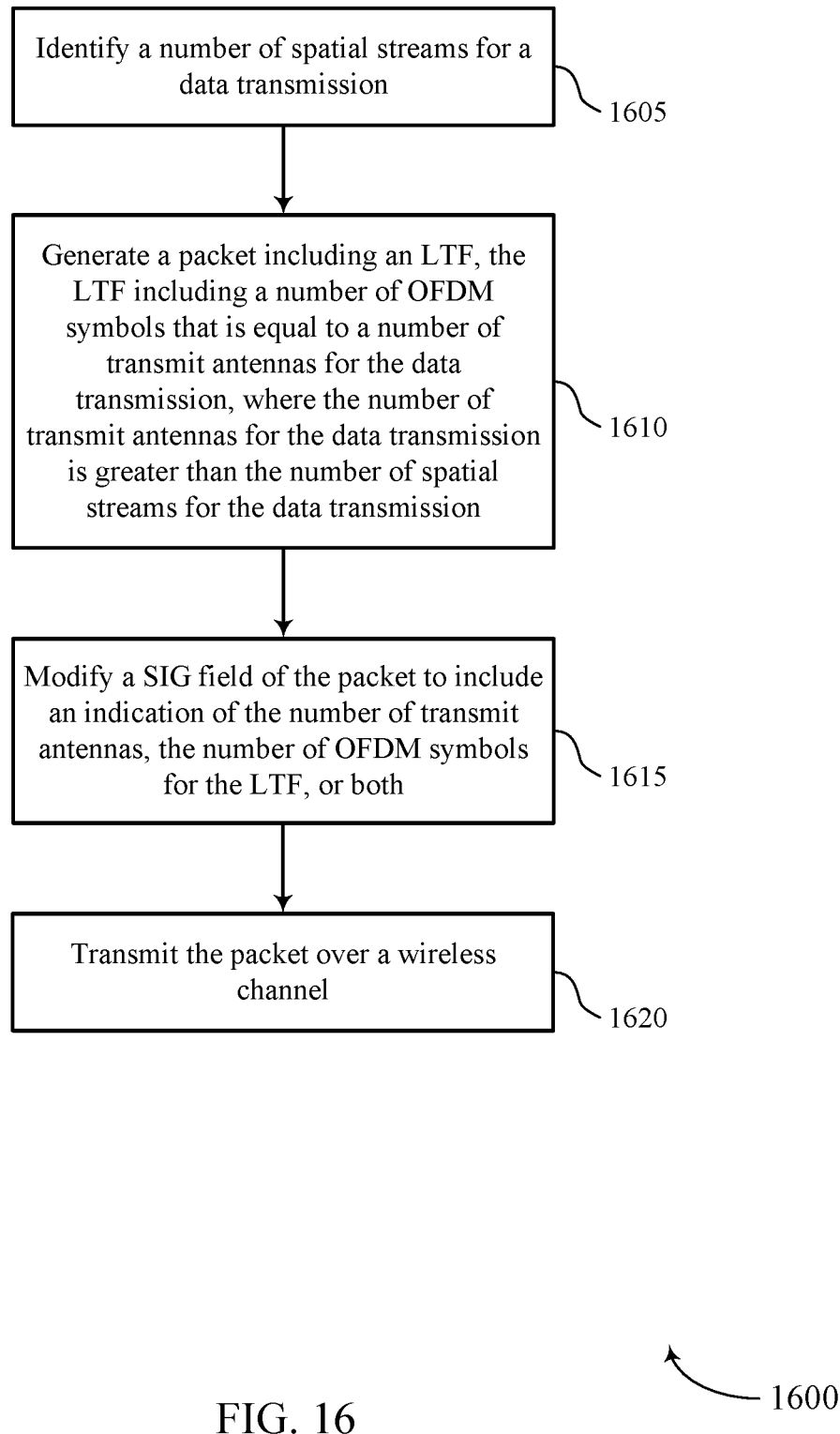

FIG. 16 shows a flowchart illustrating a method 1600 for facilitating side channel information estimation in accordance with various aspects of the present disclosure. The operations of method 1600 may be implemented by a transmitting device, such as an AP 105 or STA 115, or its components as described herein. For example, the operations of method 1600 may be performed by a transmitting device side channel estimation module as described with reference to FIGS. 5 through 8. In some examples, a transmitting device may execute a set of codes to control the functional elements of the device to perform the functions described below. Additionally or alternatively, the transmitting device may perform aspects of the functions described below using special-purpose hardware.

At 1605 the transmitting device may identify a number of spatial streams for a data transmission. The operations of 1605 may be performed according to the methods described herein. In certain examples, aspects of the operations of 1605 may be performed by a spatial stream component as described with reference to FIGS. 5 through 8.

At 1610 the transmitting device may generate a packet including an LTF, the LTF containing a number of OFDM symbols that is equal to a number of transmit antennas for the data transmission, where the number of transmit antennas for the data transmission is greater than the number of spatial streams for the data transmission. The operations of 1610 may be performed according to the methods described herein. In certain examples, aspects of the operations of 1610 may be performed by a packet generation component as described with reference to FIGS. 5 through 8.

At 1615 the transmitting device may modify a SIG field of the packet, the modified SIG field including an indication of the number of transmit antennas, the number of OFDM symbols for the LTF, or both. The operations of 1615 may be performed according to the methods described herein. In certain examples, aspects of the operations of 1615 may be performed by a SIG modifying component as described with reference to FIGS. 5 through 8.

At 1620 the transmitting device may transmit the packet, including the modified SIG field, over a wireless channel. The operations of 1620 may be performed according to the methods described herein. In certain examples, aspects of the operations of 1620 may be performed by a packet transmission component as described with reference to FIGS. 5 through 8.

Figure 17:
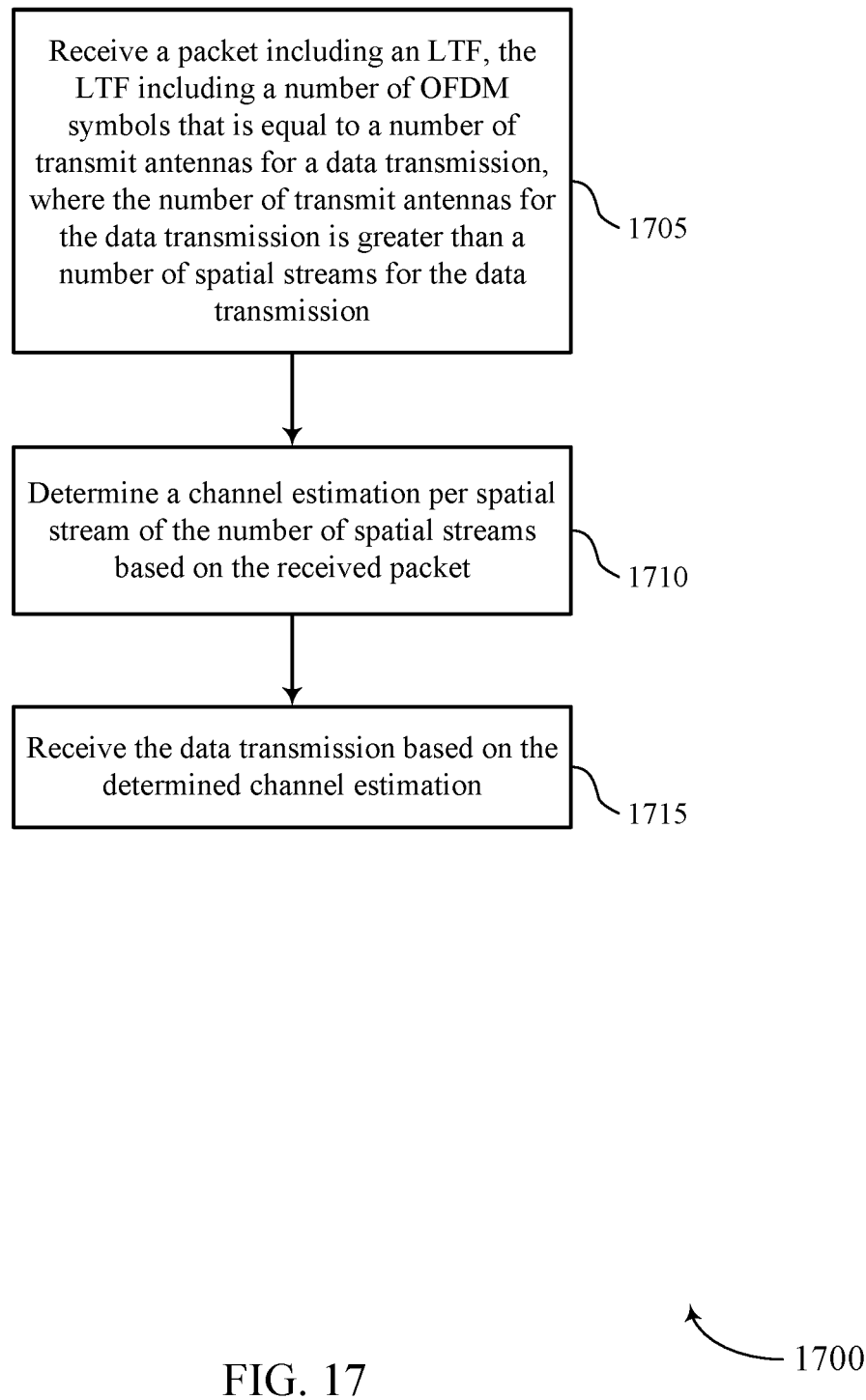

FIG. 17 shows a flowchart illustrating a method 1700 for facilitating side channel information estimation in accordance with various aspects of the present disclosure. The operations of method 1700 may be implemented by a receiving device, such as an AP 105 or STA 115, or its components as described herein. For example, the operations of method 1700 may be performed by a receiving device side channel estimation module as described with reference to FIGS. 9 through 12. In some examples, a receiving device may execute a set of codes to control the functional elements of the device to perform the functions described below. Additionally or alternatively, the receiving device may perform aspects of the functions described below using special-purpose hardware.

At 1705 the receiving device may receive a packet including an LTF, the LTF containing a number of OFDM symbols that is equal to a number of transmit antennas for a data transmission, where the number of transmit antennas for the data transmission is greater than a number of spatial streams for the data transmission. In some cases, the LTF may be received in a different number of spatial streams equal to the number of transmit antennas. The operations of 1705 may be performed according to the methods described herein. In certain examples, aspects of the operations of 1705 may be performed by a packet reception component as described with reference to FIGS. 9 through 12.

At 1710 the receiving device may determine a channel estimation per spatial stream of the number of spatial streams based at least in part on the received packet. The operations of 1710 may be performed according to the methods described herein. In certain examples, aspects of the operations of 1710 may be performed by a channel estimation component as described with reference to FIGS. 9 through 12.

At 1715 the receiving device may receive the data transmission based at least in part on the determined channel estimation. The operations of 1715 may be performed according to the methods described herein. In certain examples, aspects of the operations of 1715 may be performed by a data reception component as described with reference to FIGS. 9 through 12.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a mobile station (STA), comprising:
    receiving, from an access point (AP), a packet comprising a long training field (LTF), the LTF comprising a number of orthogonal frequency division multiplexing (OFDM) symbols that is equal to a number of transmit antennas for a data transmission, wherein the number of transmit antennas is equal to a first number of spatial streams used to receive the LTF, and the number of transmit antennas is greater than a second number of spatial streams used to receive the data transmission, and wherein the second number of spatial streams used to receive the data transmission is a subset of the first number of spatial streams used to receive the LTF;

determining a channel estimation per spatial stream of the first number of spatial streams based at least in part on the received packet; and receiving the data transmission based at least in part on the determined channel estimation.

2. The method of claim 1, wherein the received packet is formatted in a multi-user frame format.

3. The method of claim 1, further comprising:

demodulating the received packet using a pre-coding matrix, wherein the pre-coding matrix is common to the STA and the AP.

4. The method of claim 3, wherein the pre-coding matrix comprises an orthogonal matrix, wherein demodulating the received packet comprises:

identifying a total signal power allocated to one or more transmit antennas associated with the transmission of the received packet, wherein the total signal power is spread over one or more transmit antennas in accordance with the orthogonal matrix.

5. The method of claim 2, wherein the spatial streams for the data transmission comprise the subset of spatial streams of a total set of spatial streams comprising the first number of spatial streams used to receive the LTF, a size of the total set of spatial streams equal to the number of transmit antennas, and wherein receiving the packet comprises:

receiving the packet in the subset of the total set of spatial streams.

6. The method of claim 1, wherein the received packet is a null data packet (NDP), and receiving the packet comprises:

receiving the packet in a packet transmission using a same number of spatial streams as transmit antennas for the packet transmission.

7. The method of claim 6, further comprising:

determining a second channel estimation based at least in part on the received data transmission; and performing a calibration process on the channel estimation and the second channel estimation.

8. The method of claim 7, wherein performing the calibration process comprises:

performing the calibration process based at least in part on a difference between the received packet and the received data transmission in automatic gain control (AGC), timing, frequency, phase, or a combination thereof.

9. The method of claim 1, wherein the packet further comprises a modified signaling (SIG) field, the method further comprising:

determining the number of transmit antennas for the data transmission, the number of OFDM symbols for the LTF, or both based at least in part on an indication in the modified SIG field.

10. An apparatus for wireless communication, comprising:

a processor;

memory in electronic communication with the processor; and instructions stored in the memory and executable by the processor to cause the apparatus to:

obtain a packet comprising a long training field (LTF), the LTF comprising a number of orthogonal frequency division multiplexing (OFDM) symbols that is equal to a number of transmit antennas for a data transmission, wherein the number of transmit antennas is equal to a first number of spatial streams used to receive the LTF, and the number of transmit antennas is greater than a second number of spatial streams used to receive the data transmission, and wherein the second number of spatial streams used to receive the data transmission is a subset of the first number of spatial streams used to receive the LTF;

determine a channel estimation per spatial stream of the first number of spatial streams based at least in part on the obtained packet; and obtain the data transmission based at least in part on the determined channel estimation.

11. The apparatus of claim 10, wherein the obtained packet is formatted in a multi-user frame format.

12. The apparatus of claim 10, wherein the obtained packet is a null data packet (NDP), and the instructions to obtain the packet are executable by the processor to cause the apparatus to:

obtain the packet in a packet transmission using a same number of spatial streams as transmit antennas for the packet transmission.

13. The apparatus of claim 12, wherein the instructions are further executable by the processor to cause the apparatus to:

determine a second channel estimation based at least in part on the obtained data transmission; and perform a calibration process on the channel estimation and the second channel estimation.

14. The apparatus of claim 13, wherein the instructions to perform the calibration process are executable by the processor to cause the apparatus to:

perform the calibration process based at least in part on a difference between the obtained packet and the obtained data transmission in automatic gain control (AGC), timing, frequency, phase, or a combination thereof.

15. The apparatus of claim 10, wherein the packet further comprises a modified signaling (SIG) field, the instructions further executable by the processor to cause the apparatus to:

determine the number of transmit antennas for the data transmission, the number of OFDM symbols for the LTF, or both based at least in part on an indication in the modified SIG field.

16. The apparatus of claim 10, wherein the instructions are further executable by the processor to cause the apparatus to:

demodulate the received packet using a pre-coding matrix, wherein the pre-coding matrix is common to a receiving device and a transmitting device.

17. The apparatus of claim 16, wherein the pre-coding matrix comprises an orthogonal matrix, wherein demodulating the received packet comprises:

identifying a total signal power allocated to one or more transmit antennas associated with the transmission of the obtained packet, wherein the total signal power is spread over one or more transmit antennas in accordance with the orthogonal matrix.

18. The apparatus of claim 11, wherein the second number of spatial streams for the data transmission comprise the subset of spatial streams of a total set of spatial streams comprising the first number of spatial streams, a size of the total set of spatial streams equal to the number of transmit antennas, and comprises:

receive the packet in the subset of the total set of spatial streams.

19. The apparatus of claim 10, wherein the packet further comprises a modified signaling (SIG) field, and the instructions are further executable by the processor to cause the apparatus to:
determine the number of transmit antennas for the data transmission, the number of OFDM symbols for the LTF, or both based at least in part on an indication in the modified SIG field.

20. The apparatus of claim 10, further comprising:
a receiver configured to receive the packet, wherein the apparatus is configured as one of a station (STA), an access point (AP), or a wireless node.

21. An apparatus for wireless communication, comprising:
means for receiving a packet comprising a long training field (LTF), the LTF comprising a number of orthogonal frequency division multiplexing (OFDM) symbols that is equal to a number of transmit antennas for a data transmission, wherein the number of transmit antennas is equal to a first number of spatial streams used to receive the LTF, and the number of transmit antennas is greater than a second number of spatial streams used to receive the data transmission, and wherein the second number of spatial streams used to receive the data transmission is a subset of the first number of spatial streams used to receive the LTF;
means for determining a channel estimation per spatial stream of the first number of spatial streams based at least in part on the received packet; and
means for receiving the data transmission based at least in part on the determined channel estimation.

22. The apparatus of claim 21, wherein the received packet is formatted in a multi-user frame format.

23. The apparatus of claim 21, further comprising:
means for demodulating the received packet using a pre-coding matrix, wherein the pre-coding matrix is common to a transmitting device and a receiving device.

24. The apparatus of claim 22, wherein the second number of spatial streams for the data transmission comprise the subset of spatial streams of a total set of spatial streams comprising the first number of spatial streams, a size of the total set of spatial streams equal to the number of transmit antennas, and comprises:
means for receiving the packet in the subset of the total set of spatial streams.

25. The apparatus of claim 21, wherein the received packet is a null data packet (NDP), and receiving the packet comprises:
means for receiving the packet in a packet transmission using a same number of spatial streams as transmit antennas for the packet transmission.

26. The apparatus of claim 25, further comprising:
means for determining a second channel estimation based at least in part on the received data transmission; and
means for performing a calibration process on the channel estimation and the second channel estimation.

27. A non-transitory computer-readable medium storing code for wireless communication, the code comprising instructions executable by a processor to:
receive a packet comprising a long training field (LTF), the LTF comprising a number of orthogonal frequency division multiplexing (OFDM) symbols that is equal to a number of transmit antennas for a data transmission, wherein the number of transmit antennas is equal to a first number of spatial streams used to receive the LTF, and the number of transmit antennas is greater than a second number of spatial streams used to receive the data transmission, and wherein the second number of spatial streams used to receive the data transmission is a subset of the first number of spatial streams used to receive the LTF;
determine a channel estimation per spatial stream of the first number of spatial streams based at least in part on the received packet; and
receive the data transmission based at least in part on the determined channel estimation.

28. The method of claim 3, wherein the pre-coding matrix comprises a full rank square matrix based at least in part on the number of spatial streams used to transmit the LTF and the number of transmit antennas.

* * * * *